US010192018B1

(12) United States Patent
Gerousis et al.

(10) Patent No.: US 10,192,018 B1
(45) Date of Patent: Jan. 29, 2019

(54) METHOD AND SYSTEM FOR IMPLEMENTING EFFICIENT TRIM DATA REPRESENTATION FOR AN ELECTRONIC DESIGN

(71) Applicant: Cadence Design Systems, Inc., San Jose, CA (US)

(72) Inventors: Vassilios C. Gerousis, San Jose, CA (US); Shane Zhang, Fremont, CA (US); Jianmin Li, Los Gatos, CA (US); Stefanus Mantik, San Jose, CA (US); Louis Tsai, Hsinchu (TW)

(73) Assignee: Cadence Design Systems, Inc., San Jose, CA (US)

( * ) Notice: Subject to any disclaimer, the term of this patent is extended or adjusted under 35 U.S.C. 154(b) by 33 days.

(21) Appl. No.: 15/087,933

(22) Filed: Mar. 31, 2016

(51) Int. Cl.
*G06F 17/50* (2006.01)

(52) U.S. Cl.
CPC ...... *G06F 17/5072* (2013.01); *G06F 17/5081* (2013.01); *G06F 17/5077* (2013.01); *G06F 2217/12* (2013.01)

(58) Field of Classification Search
CPC ............ G06F 17/5072; G06F 17/5077; G06F 17/5081; G06F 2217/12
USPC ........ 716/119, 122, 123, 124, 129, 130, 111, 716/52, 55; 703/15
See application file for complete search history.

(56) References Cited

U.S. PATENT DOCUMENTS

| 4,651,284 | A * | 3/1987 | Watanabe | ........... G06F 17/5068 706/45 |
| 6,523,162 | B1 * | 2/2003 | Agrawal | ............. G06F 17/5081 716/53 |
| 7,281,222 | B1 * | 10/2007 | Babcock | ................... G03F 1/36 716/53 |
| 7,590,955 | B1 * | 9/2009 | Nequist | ............... G06F 17/5081 716/126 |
| 7,594,207 | B2 | 9/2009 | Mantik et al. | |
| 7,926,005 | B1 | 4/2011 | Li et al. | |
| 7,941,782 | B2 * | 5/2011 | Kai | ........................ G11C 5/025 716/119 |
| 8,069,432 | B2 | 11/2011 | Zhang et al. | |
| 8,086,978 | B2 | 12/2011 | Zhang et al. | |
| 8,151,229 | B1 | 4/2012 | Chang et al. | |
| 8,336,010 | B1 | 12/2012 | Chang et al. | |
| 8,782,570 | B1 | 7/2014 | Li et al. | |
| 8,863,048 | B1 | 10/2014 | Gerousis et al. | |
| 8,881,085 | B1 * | 11/2014 | Karp | ................... G06F 17/5081 326/37 |
| 8,935,649 | B1 | 1/2015 | Salowe | |
| 9,087,174 | B1 | 7/2015 | Zhang et al. | |
| 9,117,052 | B1 * | 8/2015 | Salowe | ............... G06F 17/5077 |
| 9,286,432 | B1 | 3/2016 | Gerousis et al. | |
| 9,372,952 | B1 | 6/2016 | Sun et al. | |
| 9,462,674 | B1 * | 10/2016 | Fakhruddin | ......... G06F 17/5045 |
| 9,703,918 | B2 * | 7/2017 | Ho | ....................... G06F 17/5081 |

(Continued)

OTHER PUBLICATIONS

U.S. Appl. No. 14/465,853, filed Aug. 22, 2014.

*Primary Examiner* — Phallaka Kik

(74) *Attorney, Agent, or Firm* — Vista IP Law Group, LLP

(57) ABSTRACT

An improved approach is described to implement trim data representation for an electronic design. Instead of maintaining a gap shape object for every gap in the layout, existing objects adjacent to the gap location are configured to include attributes of the gap shape. The properties of the gap shape can then be derived from the adjacent objects.

23 Claims, 24 Drawing Sheets

(56) References Cited

U.S. PATENT DOCUMENTS

| | | | | |
|---|---|---|---|---|
| 10,002,827 B2* | 6/2018 | Ning | | G06F 17/5077 |
| 2003/0229412 A1* | 12/2003 | White | | G06F 17/5068 700/121 |
| 2004/0025125 A1* | 2/2004 | Li | | G06F 17/5068 716/112 |
| 2004/0255258 A1* | 12/2004 | Li | | G06F 17/5068 716/122 |
| 2005/0132306 A1* | 6/2005 | Smith | | G06F 17/5068 716/114 |
| 2006/0085772 A1* | 4/2006 | Zhang | | G03F 1/36 716/52 |
| 2006/0150169 A1* | 7/2006 | Cook | | G06F 8/10 717/156 |
| 2006/0265679 A1* | 11/2006 | Scheffer | | G03F 7/70091 716/52 |
| 2007/0113216 A1* | 5/2007 | Zhang | | G06F 17/5068 716/53 |
| 2007/0288219 A1* | 12/2007 | Zafar | | G03F 1/84 703/14 |
| 2009/0294981 A1* | 12/2009 | Smayling | | B82Y 10/00 257/773 |
| 2009/0300575 A1* | 12/2009 | Kornachuk | | G06F 17/5068 716/50 |
| 2011/0014786 A1 | 1/2011 | Sezginer et al. | | |
| 2013/0037915 A1* | 2/2013 | Melzner | | G06F 17/5081 257/618 |
| 2014/0007024 A1* | 1/2014 | Tsai | | G06F 17/5068 716/52 |
| 2015/0070352 A1* | 3/2015 | Jones | | G06T 7/0044 345/420 |
| 2015/0254391 A1* | 9/2015 | Omodaka | | G06F 17/5077 716/115 |
| 2016/0232270 A1* | 8/2016 | Chou | | G06F 17/5081 |
| 2016/0243762 A1* | 8/2016 | Fleming | | B29C 67/0088 |
| 2016/0266486 A1* | 9/2016 | Wuister | | G03F 7/0002 |
| 2016/0274455 A1* | 9/2016 | Wei-De | | G03F 1/36 |
| 2016/0328512 A1* | 11/2016 | Chen | | G06F 17/5081 |
| 2017/0092556 A1* | 3/2017 | Gustafson | | H01L 23/055 |
| 2017/0186687 A1* | 6/2017 | Ning | | H01L 23/5226 |

* cited by examiner

to represent electronic and circuit IC components as geometric objects with varying shapes and sizes.

METHOD AND SYSTEM FOR IMPLEMENTING EFFICIENT TRIM DATA REPRESENTATION FOR AN ELECTRONIC DESIGN

FIELD

This disclosure relates to the field of electrical design and verification.

BACKGROUND

With the advent of advanced technology nodes, it is no longer possible to use conventional photolithography techniques to accurately pattern the geometries required for 20 nm process nodes and below. Therefore, foundries have turned to various multi-patterning lithography techniques to address this issue. With these multi-patterning techniques, shapes on the same layer manufactured with multi-patterned technology (MPT) are created through multiple exposures using multiple masks.

Physical design tools must be able to assign shapes on an MPT process layer to a specific mask so that they can check mask-based physical design rule rules to ensure that the design can be fabricated. Physical design tools therefore often include extensions that are able to represent MPT information. The extensions support assigning mask "colors" to shapes and vias, where different colors indicate the usage of a different photolithographic mask.

Numerous techniques may be employed to implement a multi-patterning approach that implements multiple colors for lines and metal cuts. SADP (self-aligned double patterning) and SAQP (self-aligned quadruple patterning) are both examples of multi-patterning approaches that can be used to manufacture modern electronic circuit designs. SADP and SAQP are described here merely as illustrative example of multi-patterning techniques, and it is expressly noted that the inventive concepts described herein are applicable to multiple types of multi-patterning technologies and are not restricted only to SADP and SAQP technologies.

Using multiple core masks often give rise to systematic or non-systematic alignment or overlay issues between the multiple core masks. Recent developments avoid such alignment or overlay issues by using a core mask and a trim mask (or block mask) for each layer to be printed on a lithographic system.

For multi-patterning processing (e.g., using either SADP or SAQP), the core mask is used to create a core layout (also referred to as a "mandrel" layout) to implement mandrels, which are the printed patterns generated by the core mask. Deposition of sidewall materials is then performed, followed by removal of certain portions of the core and/or sidewall materials (depending upon the specific design and the type of processing that is performed). Trimming is then performed using the trim mask. Application of the trim mask forms a "gap" between shapes on the circuit layout, where the term "gap" may also be referred to as "TrimMetal", "CutMetal", "trim shape", and/or "trim layer shape", depending upon the terminology used by the specific fabrication facility that manufactures the electronic design (with these terms being used herein inter-changeably).

An integrated circuit designer may use a set of EDA application programs to create a physical integrated circuit design layout with regards to the multi-patterning process. The EDA application implements layout designs having geometric shapes of different materials to create the various electrical components on an integrated circuit and to represent electronic and circuit IC components as geometric objects with varying shapes and sizes.

After an integrated circuit designer has created an initial integrated circuit layout, the integrated circuit designer then verifies and optimizes the integrated circuit layout using a set of EDA testing and analysis tools. Verification may include, for example, design rule checking (DRC) to verify compliance with rules established for various IC parameters. It is noted that such rule checking may also be performed during the design process (e.g., during the placement/routing process) to create correct-by-construction designs.

With the advent of 32 nanometer (nm) technology and beyond (e.g., 22 nm, 14 nm, 10 nm, 7 nm, etc.), the trim mask often requires its own design rules. With these rules, the properties of the gaps between objects formed by the trim mask are checked to ensure compliance with design requirements promulgated by the foundry or fabrication facility that will be responsible for using the mask to manufacture the electronic product. For example, these rules will be used to make sure appropriate spacing exists between metal ends in the layout with regards to the trim mask gaps.

With deep submicron designs, a fabrication facility may now require the gap shapes in the design to be materialized as a gap shape object for each of the gaps that will be formed in the design by the trim mask. The reason for this is because the fabrication facility may need the existence of these gap shape objects to implement finer grained design rule checking of the gaps formed by the trim masks.

However, requiring these gap shapes to be materialized as actual objects having the relevant shape properties of the gap creates a significant amount of computational and storage expense for the EDA processing application. This is because a modern electronic design may have a very large number of layout objects, which corresponds to an extremely large number of gap shape objects for which storage space needs to be allocated and maintained. In addition, each edit to the layout that modifies a pertinent layout object, e.g., editing the location or dimension of a wire object, will now require the additional expense of editing each and every gap shape object that is affected by the edit to the corresponding wire, e.g., to edit the location, width, and/or height properties of the gap shape when its adjacent wire shape is edited. For a modern electronic design having a large number of layout objects (e.g., having hundreds of millions or even billions of transistors and corresponding wiring), the level of overhead to implement and maintain gap shape objects could negatively affect the operation and performance of the EDA software tools, potentially adding excessive amounts of time delays to the process of generating and verifying the circuit design.

Therefore, there is a need for an improved approach to implement trim data representations for an electronic design that avoids these and other problems.

SUMMARY

Embodiments of the invention provide an improved method, system, and computer program product to implement trim data representations for an electronic design. According to some embodiments of the invention, instead of maintaining a gap shape object for every gap in the layout formed by a trim mask, existing objects corresponding to the gap location are configured to include attributes of the gap shape. The properties of the gap shape can then be derived from the adjacent objects. In this way, the system does not need to incur the expense of continuously creating and maintaining gap shape objects. Furthermore, any edits to the existing objects will inherently also result in updates to the properties of the gap shapes, without having to separately edit the gap shape objects.

The transformation to derive a real shape (e.g., for gap/trim objects) can be performed for any suitable purpose, such as for display purposes or to output to standard file formats such as GDS2. By deriving these shapes rather than maintaining them persistently, EDA processing, such as routing, can therefore operate on wires, TRIM objects, or other pertinent objects simultaneously in an efficient manner, while also supporting new rules for metal TRIMs added for new technology nodes like 10 nm and 7 nm or below.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

In order that the present invention is better understood, some embodiments of the invention will now be described, by way of example only, with reference to the accompanying drawings.

DETAILED DESCRIPTION

Embodiments of the invention provide an improved method, system, and computer program product to implement trim data representations for an electronic design. According to some embodiments of the invention, instead of maintaining a gap shape object for every gap in the layout, existing objects corresponding to the gap location are configured to include attributes of the gap shape. The properties of the gap shape can then be derived from the adjacent objects. In this way, the system does not need to incur the expense of continuously creating and maintaining gap shape objects. Furthermore, any edits to the existing objects will inherently also result in updates to the properties of the gap shapes, without having to separately edit gap shape objects.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1:
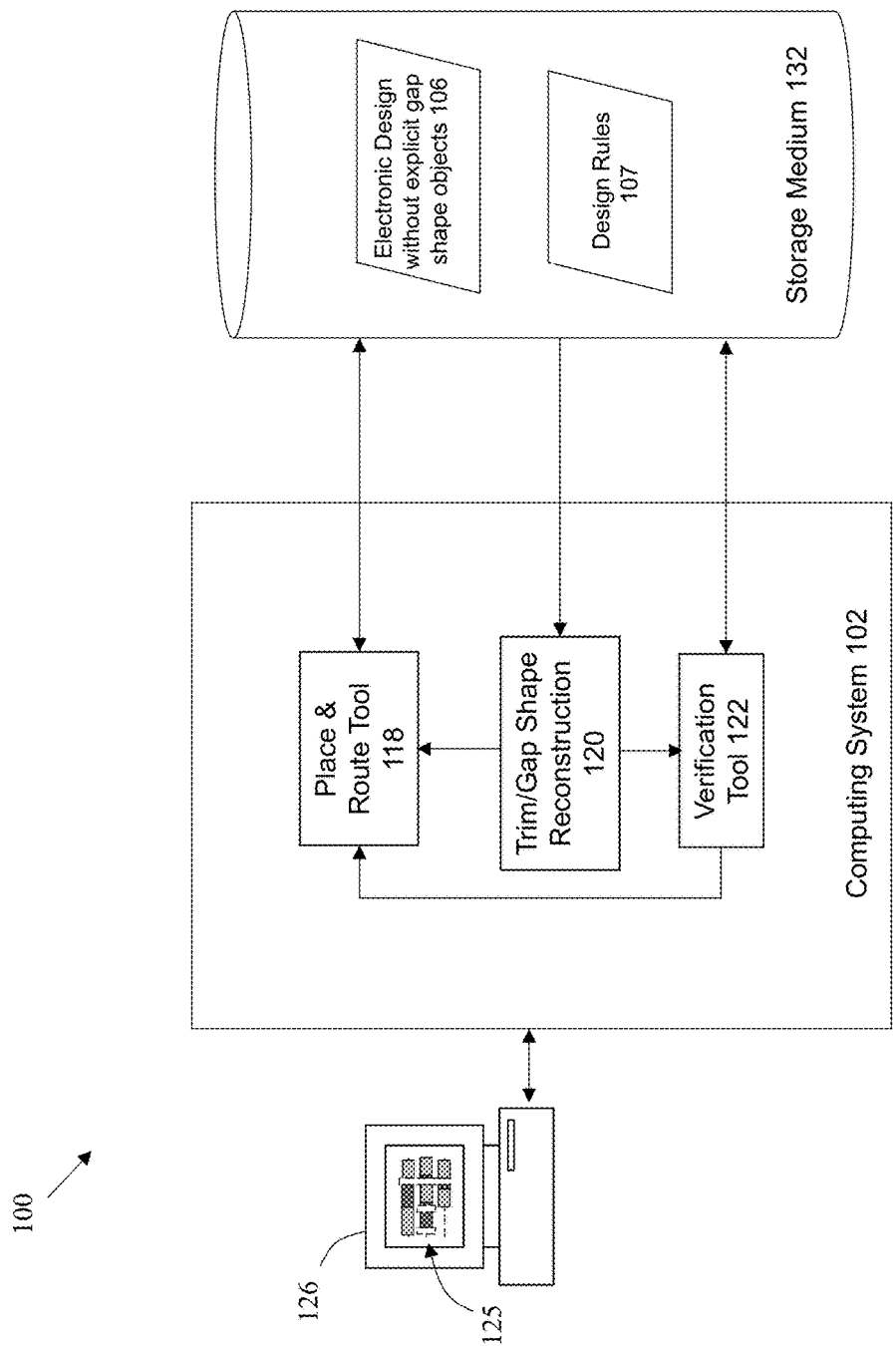
FIG. 1 illustrates an example system which may be employed in some embodiments of the invention to implement trim data representations for an electronic design.

FIG. 1 illustrates an example system 100 which may be employed in some embodiments of the invention to perform design and verification activities for an electronic design. System 100 may include one or more users at one or more user station(s) 126 that operate the system 100 to design or verify the electronic design. Such users include, for example, design engineers or verification engineers. User station 126 comprises any type of computing station that may be used to operate, interface with, or implement EDA applications or devices. Examples of such user stations 126 include for example, workstations, personal computers, or remote computing terminals. User station 126 comprises a display device, such as a display monitor, for a user interface 125 that displays electronic design data to users at the user station 126. User station 126 also comprises one or more input devices for the user to provide operational control over the activities of system 100, such as a mouse or keyboard to manipulate a pointing object in a graphical user interface.

One or more EDA tools may be provided at one or more computing systems 102 within system 100. For example, a place & route tool 118 may be provided to perform layout, placement, and routing activities for an electronic design. A verification tool 122 may be provided to perform verification activities, such as DRC activities using design rules 107.

According to some embodiments of the invention, instead of continuously maintaining a gap shape object for every gap in the layout, existing objects corresponding to (e.g., adjacent to) the gap location are configured to include attributes of the gap shape. Therefore, when the place & route tool 118 generates electronic design data 106, that electronic design data 106 comprises layout objects that includes attributes for the gap shapes.

In some embodiments, gap shape objects are simply not maintained at all in the system. Instead, a trim/gap shape reconstruction module 120 can reconstruct the gap shape as necessary, where the reconstructed gap shapes are derived from the properties of the gap shape that are stored in adjacent objects. The reconstructed gap shapes can then be passed to the verification tool 122 or place & route tool 118 to perform DRC checks or routing activities. In some embodiments, on certain layers, a virtual grid is added for trims/gaps to guide the router to meet DRC rules. Each layer (e.g., M1, M2 and/or M3 layers) can be configured to have its own set of rules and properties for trim/gaps.

The gap shape may also be reconstructed for display in user interface 125. In some embodiments, the gap shape is reconstructed using industry standard formats such as GDS2, OASIS and/or DEF.

In an alternative embodiment, simple gap shape objects may be maintained for the gaps; however, these simple gap shapes do not include shape properties for the gaps. Instead those properties are explicitly maintained as attributes in adjacent objects. For example, the location, width, and/or height attribute for the gap shape are not maintained in the simple gap shape object, but are instead derived from neighboring objects. As before, this alternative embodiment would also utilize the trim/gap shape reconstruction module 120 to reconstruct the gap shape as necessary. The advantage of this approach is that the simple gap shapes could be maintained for representation purposes in the design database, but since it does not persistently include the shape properties, the gap shape objects in this approach would therefore not need to incur the expense of being maintained every time the gap shape changes (e.g., from edits of surrounding objects).

Any of the data used by system 100 may be stored in one or more computer readable storage devices 132. For example, both the electronic design data 106 and the design rules 107 may be stored in computer readable storage devices 132. Computer readable storage device 132 includes any combination of hardware and/or software that allows for ready access to the data that is located at the computer readable storage device 132. For example, computer readable storage device 132 could be implemented as computer memory operatively managed by an operating system. The computer readable storage device 132 could also be implemented as an electronic database system having storage on persistent and/or non-persistent storage.

Figure 2:
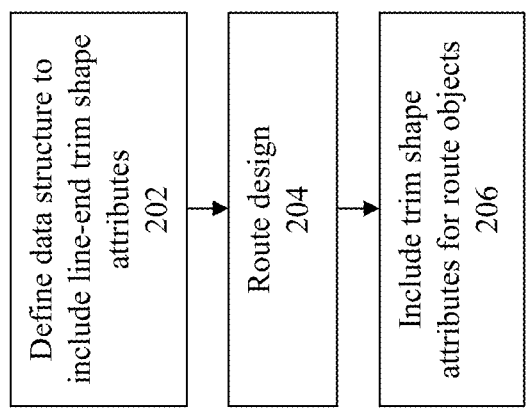
FIG. 2 shows a flowchart of an approach to implement advanced trim data representation according to embodiments of the invention.

FIG. 2 shows a flowchart of an approach to implement advanced trim data representations according to embodiments of the invention. At 202, one or more data structures are defined for objects in the layout that include attributes corresponding to trim cut/layer shape properties. Any suitable set of attributes for the trim layer may be associated with these data structures. For example, height property, width property, and color property are examples of certain attribute information for a trim layer shape that can be associated with the line-end portion of the data structure for a wire object in the layout.

Various additional constraints and/or other properties may be configured to pertain to the trim layer properties established for trim layer. For example, one possible constraint to establish and/or require a consistent width for the gap between the line ends of the two objects that bound the gap shape. Another possible constraint is to require alignment of the two line-end shapes on two sides of the gap shape.

It is noted that various types of structures may need to be represented when performing place and route activities using some embodiments of the invention. For routing purposes, examples of such structures may include net metals (e.g., interconnects, metal patches/fills), OBS shapes (e.g., shapes pertaining to obstructions), pins (connected and unconnected), floating metal shapes, and/or trim metal.

After the appropriate data structures have been established, then at 204 when placement/routing/layout activities are performed, various objects may be placed onto the layout. Routing maybe performed with various types of colored metal cuts. Therefore, the router may create wires and other objects having properties pertaining to: (a) color; (b) size of shapes; (c) spacing between similar colors and different colors; and/or (d) specific constraints based upon one or more rules.

Based upon the type of trim, the router may implement the design having a number of different colors (e.g., two colors or three colors, where the different colors pertain to different fabrication/processing masks). For example, each trim may be assigned to a given color, e.g., based at least in part upon wire color and/or track color. Various types of alignment may be implemented, e.g., to align with regards to positions for similar trims. Since the trim-related shapes may be layer-specific, critical layers can be treated with multi-color trim shapes. Less critical layers (e.g., having larger metal pitches) can use single color trims.

With regards to the trim layer shapes, at 206, the appropriate attributes of corresponding objects are modified to include data about the trim metal gap shapes. It is noted that various constraints may be imposed upon the trim metal shape attributes to be inserted into the adjacent objects. For example, an example constraint may require the trim metal shape to always be rectangular, and to directly abut a real metal line end (for either a wire objects, pin object, fill, or any other suitable type of interconnect). It is noted that not every real metal end may need to have an abutting trim metal shape. In some embodiments, the trim metal shape has a width dimension that is fixed (e.g., per DRM (design rule manual) requirements). The trim metal height dimension may depend upon DRM requirements, other objects/shapes, as well as properties of neighboring tracks.

Figure 3A:
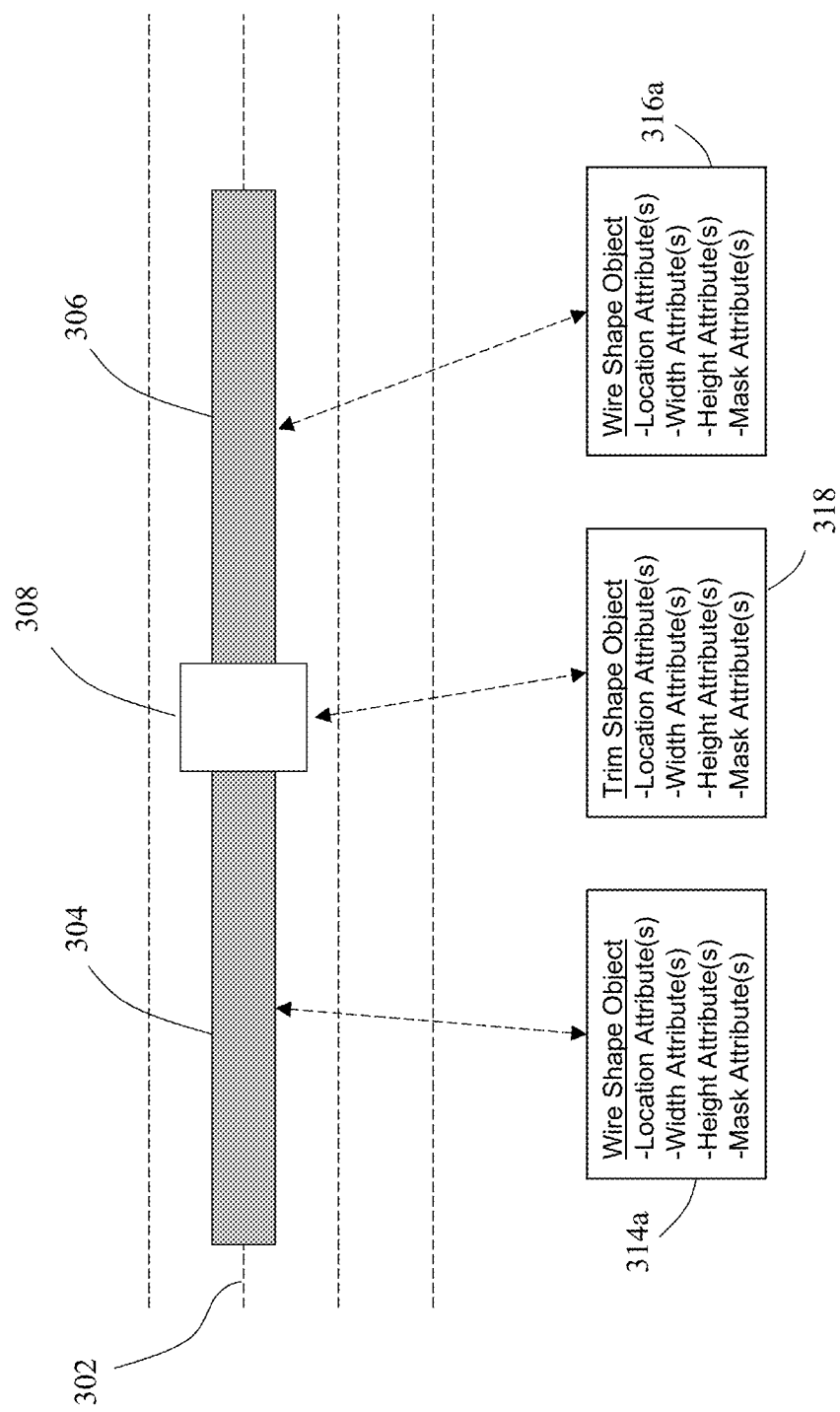
FIG. 3A illustrates an approach that requires continuous materialization of a trim metal object.

FIG. 3A illustrates the non-preferred approach where the gap shapes are explicitly represented as materialized objects. Here, objects 304 and 306 have been placed along routing track 302. These objects correspond to wires each having a wire-end that directly abut a gap shape 308.

In this example, an explicitly materialized trim shape data structure 318 is created and is continuously maintained, where this structure 318 identifies all pertinent shape properties of the gap shape 308, such as location, width, height, and color attributes. Each of the wire objects 304 and 306 also correspond to their respective data structures 314*a* and 316*a* that contain attributes pertinent for these wire objects.

The disadvantage with this approach is that structure 318 needs to be created and continuously maintained for each and every gap 308 created by the trim mask in the layout. Consider the situation when wire objects 304 and 306 are edited, thereby causing a change to some or all the attributes for structures 314*a* and 316*a*. In this situation, the structure 318 would have to be explicitly edited as well to correspond to the new location/size properties of the edited wire objects 304 and 306. When there are situation where the layout includes a large number of gaps, then the expense of creating and maintaining the structures 318 for the gap shapes 308 may be overwhelming.

Figure 3B:
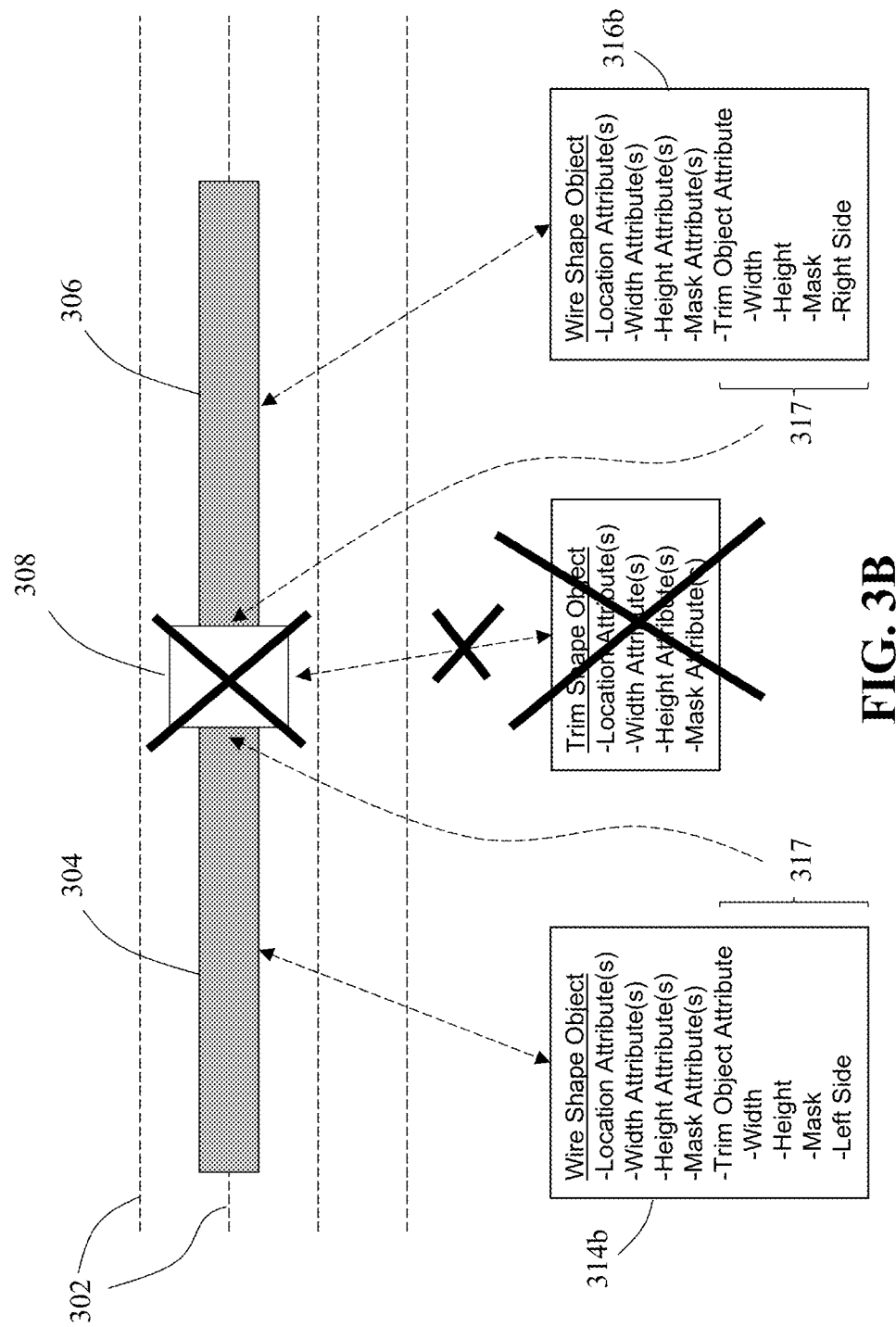
FIGS. 3B-E illustrate an approach which does not require continuous materialization of a trim metal object.

FIG. 3B illustrates an improved approach according to some embodiments of the invention. Here, each of the wire objects 304 and 306 pertain to data structures 314*b* and 316*b*, respectively, having attributes 317 pertaining to the gap shape 308. For example, each of these structures may include a width attribute, a height attribute, mask/color attributes, and/or whether the object is on the left side or right side of the gap shape.

Figure 3C:
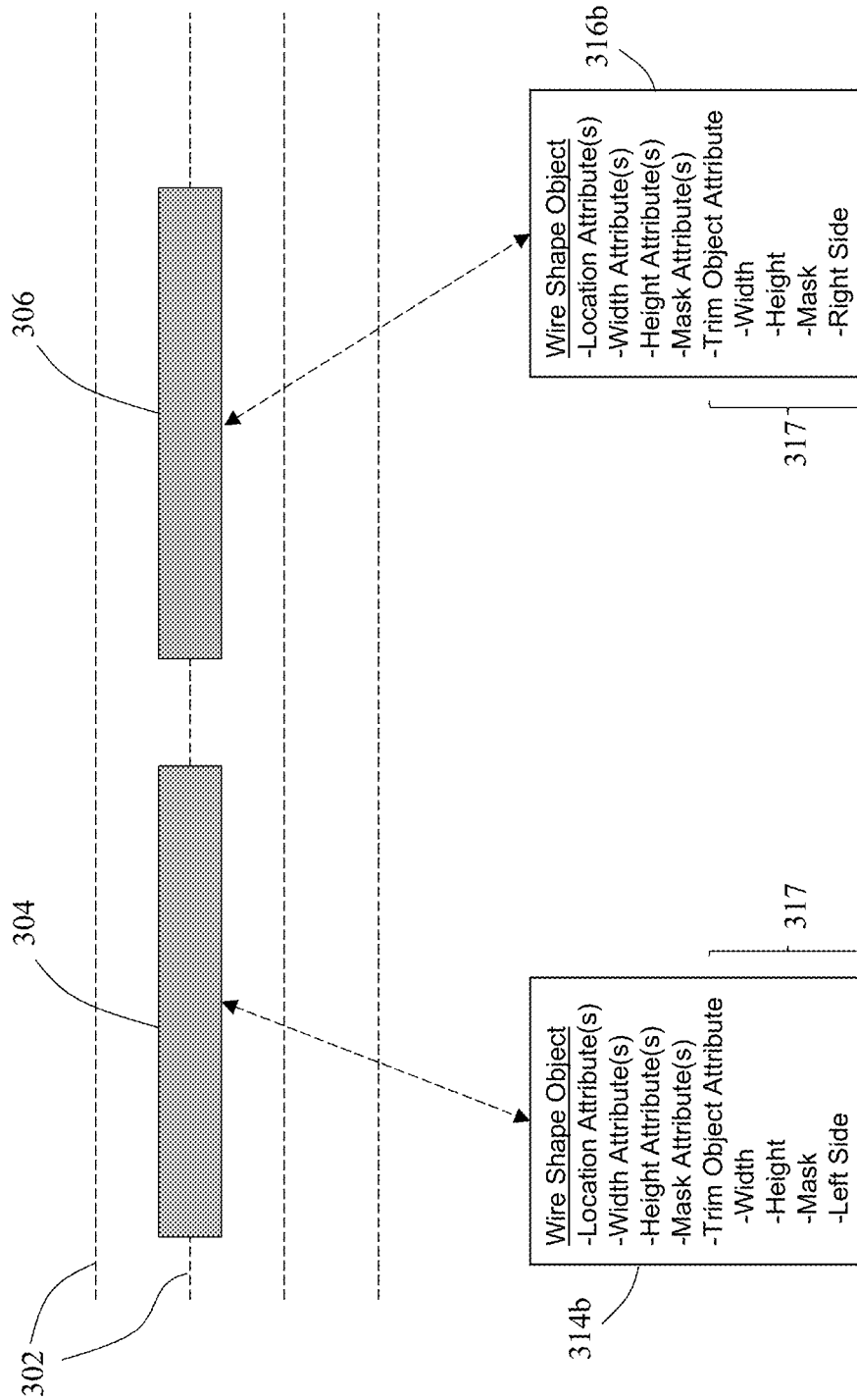
Figure 3D:
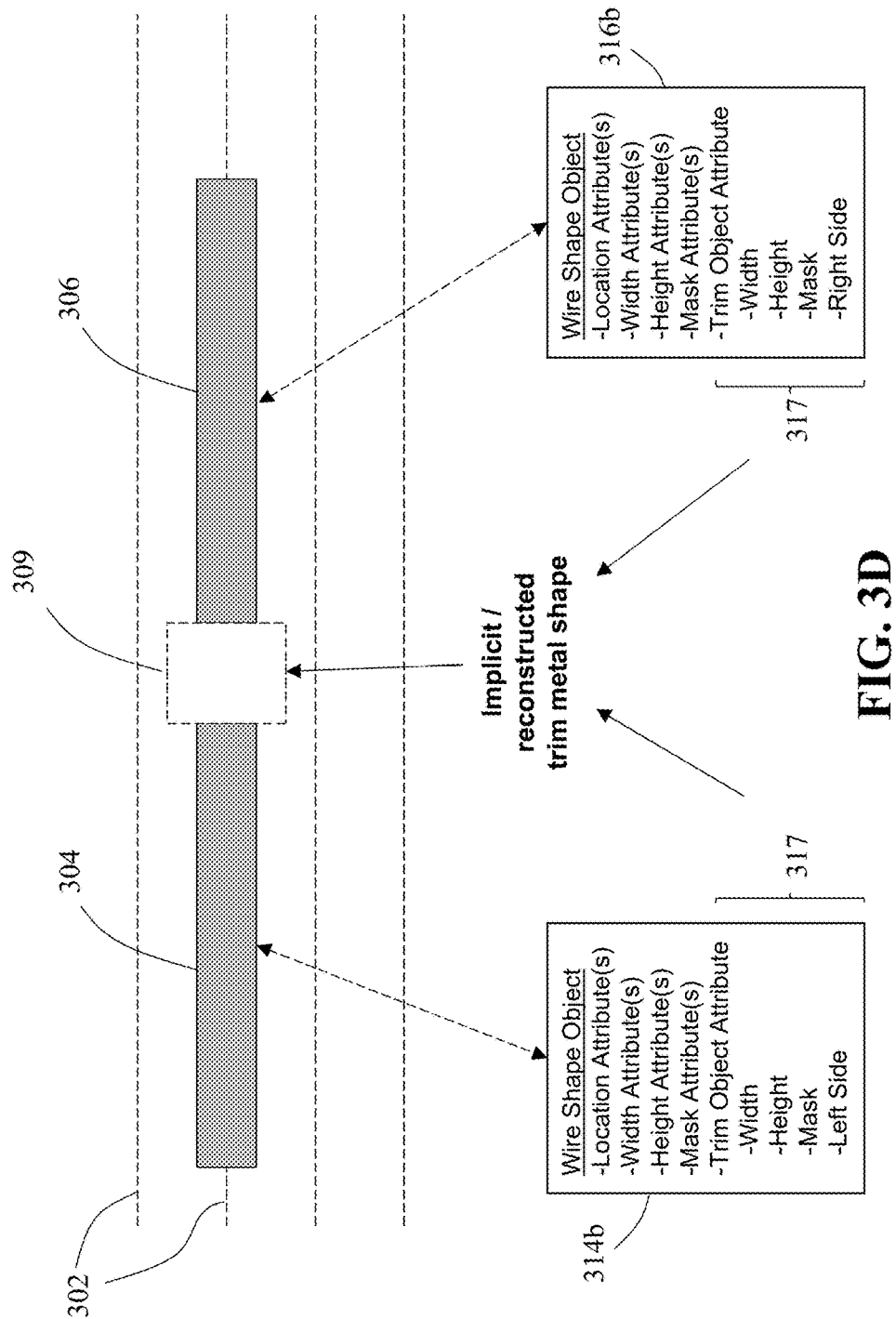

In this way, as shown in FIG. 3C, there is no longer any need to create and maintain on a continuous basis any materialized data structure that includes these shape properties for the gap shape. The advantage of this approach is that the system does not need to incur the expense of continuously creating and maintaining gap shape objects/structures. Instead, as shown in FIG. 3D, a gap shape 309 can be implicitly maintained by reconstructing properties for shape 309 from the attributes 317 maintained in neighboring objects, e.g., where the location of the gap shape is derived from the location of the adjacent line ends for wires 304/306, and the width/height/color attributes for the gap shape are retrieved from the attributes 317.

In the example described above, the width, height, and color information for the gap shape is maintained as attributes in both of the neighboring shapes. One reason for maintaining this information in both neighboring objects is to reduce latency when performing design processing, since the need to reconstruct the gap shape may arise from analysis that is performed at either of the two shapes 304 and 306. However, it is noted that in an alternate embodiment, the gap shape attribute information is maintained only at a subset of the neighboring objects (e.g., at either 314b or 316b, but not at both). In this alternate embodiment, the advantage is the storage savings by not duplicating the gap shape information, but the possible inefficiency is that analysis that occurs at a neighbor shape not having that gap shape information may need to undergo additional time and processing to acquire that gap shape information from the other neighboring object.

Figure 3E:
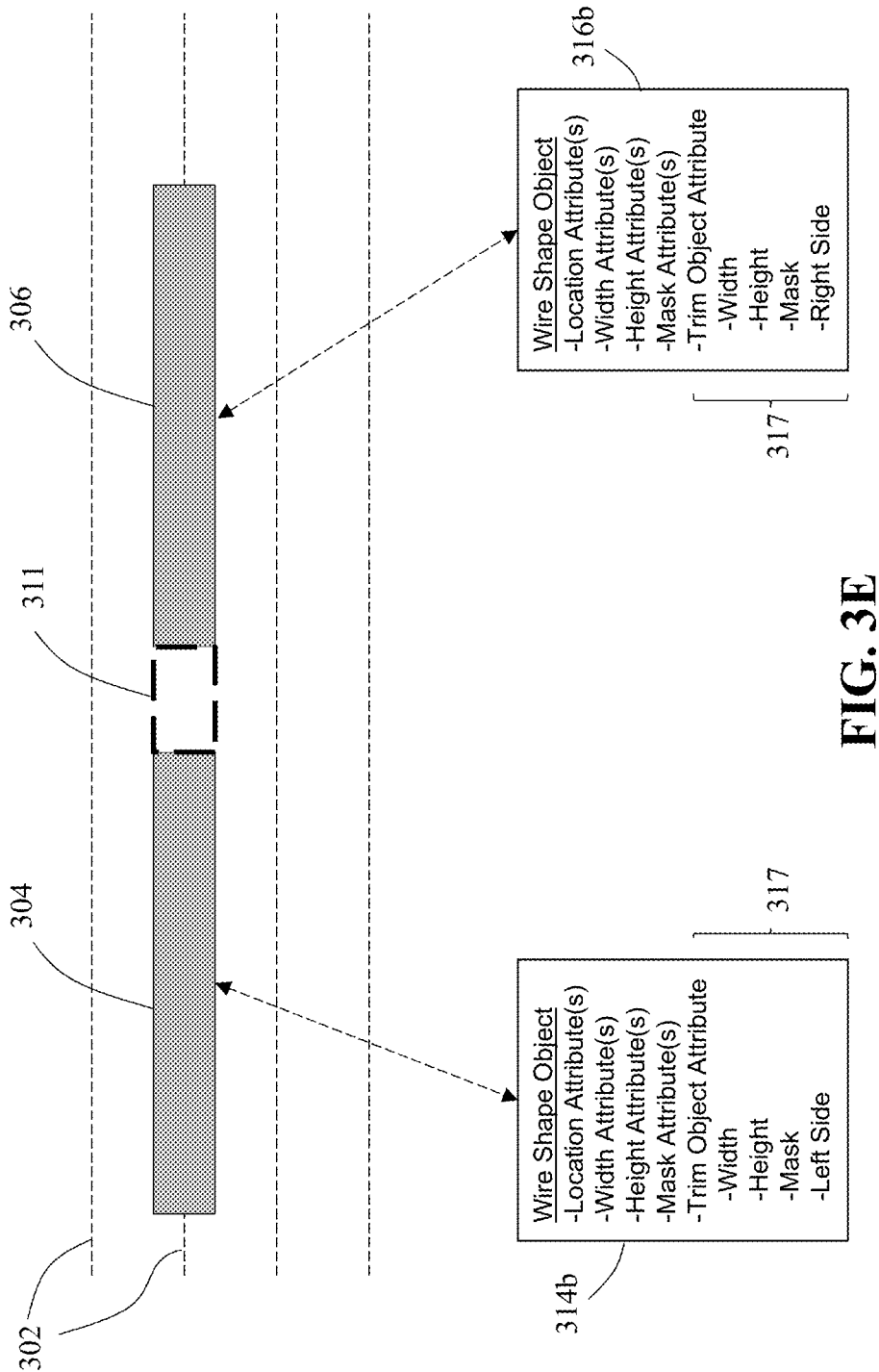

It is noted that the principles described herein may be applied to implicitly represent other shapes as well, where these other shapes are also not explicitly maintained as objects in the design system. For example, FIG. 3E shows a shape 311 that is not explicitly represented as a persistent object, but is created to "fill" the gap between wires 304 and 306. For certain manufacturing processes, despite the gap between the wires 304 and 306, one or more design rules may need to be applied on the basis of these two wires being joined together into a single wire shape (as if the gap does not exist between these two shapes). To handle these types of rules, shape 311 can be reconstructed to fill in the gap, where the width of the shape 311 completely fills the gap and the height of shape 311 matches the wires 304/306 on either side of the gap.

Figure 4:
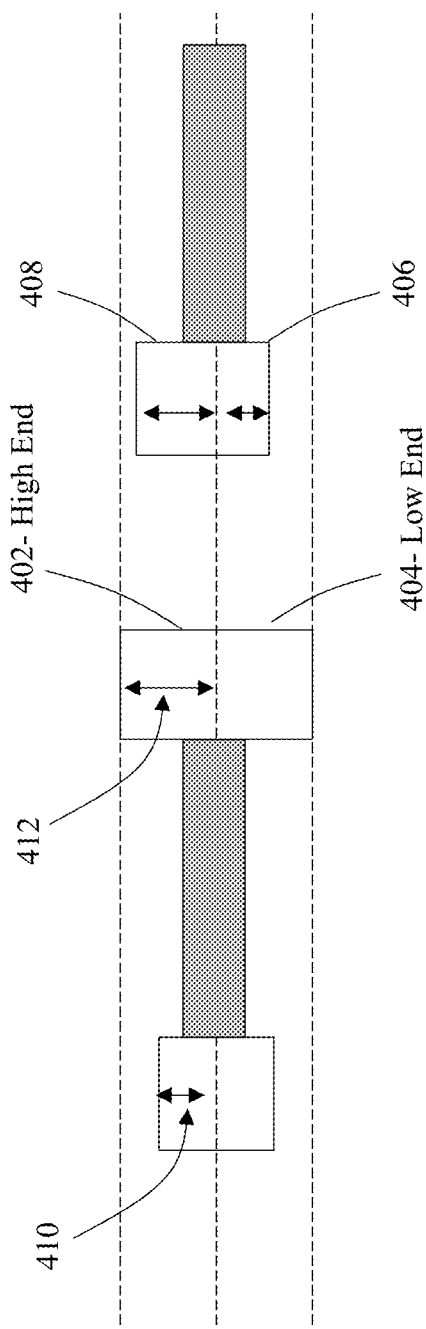
FIG. 4 illustrates example approaches to implement attributes for the trim metal object.

The attributes maintained for the gap in neighboring objects may be represented in any number of different ways. For example, consider the height attributes that are maintained for the gap shape. As shown in FIG. 4, a first height attribute 404 can be maintained for a low end of the trim metal shape and a second height attribute 402 can be maintained for the high end of the trim metal shape. In some embodiments, the first height and the second height have the same attribute values, as shown for attributes 402 and 404. In other embodiments, the first height 406 for the low end and the second height 408 for the high end may have differing values.

The height value may be expressed as an actual numerical height value. Alternatively, if there is a set number of possible height values, then a height index value may be used to express the height value. For example, it can be seen in FIG. 4 that height 410 has a first height value and height 412 has a second height value. If values 410 and 412 are among the limited number of height possibilities in the layout, then an index can be established to refer to each of these possible values. The height attribute for the trim metal shape can be configured to refer to these height index values rather than an actual numerical height. In some embodiments, a width index may be employed in a similar manner for a set number of width values.

Figure 5:
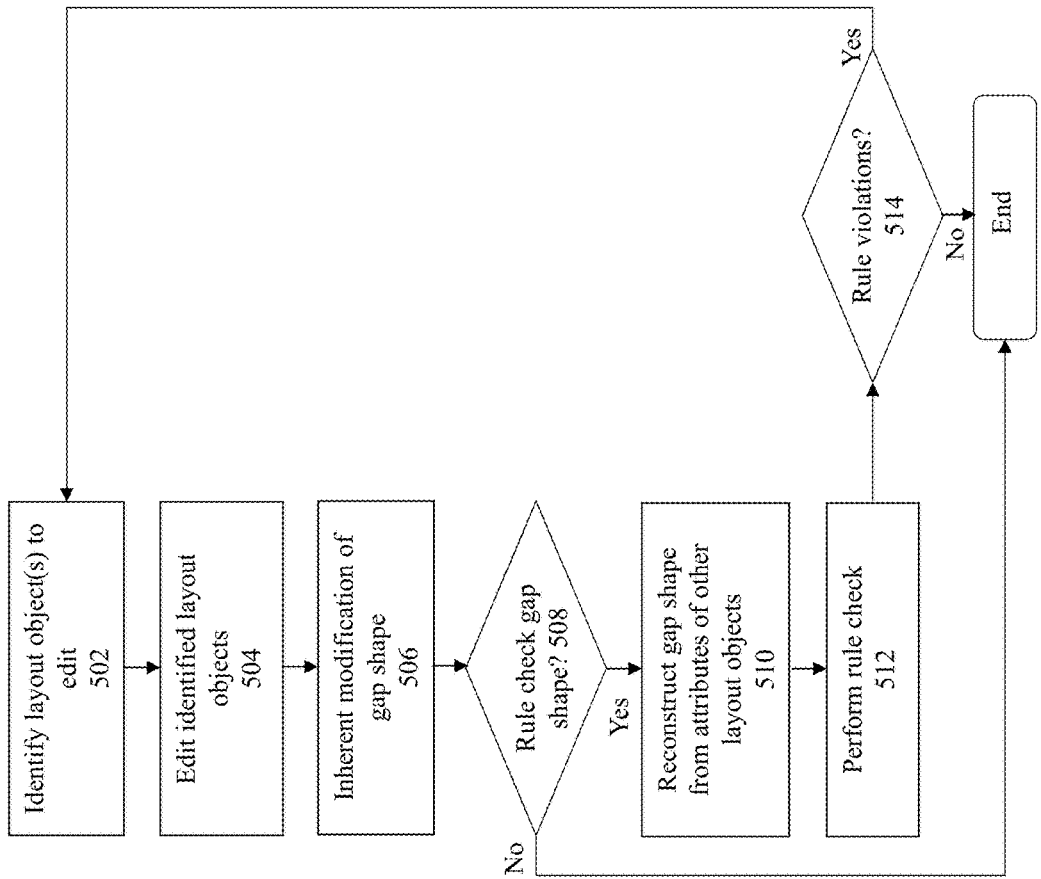
FIG. 5 shows a flowchart of an approach to perform edits to existing objects that will also inherently result in updates to the properties of gap shapes.

It is noted that any edits to the existing objects will inherently result in updates to the properties of the gap shapes, without having to separately edit gap shape objects/structures. FIG. 5 shows a flowchart that illustrates this aspect of embodiments of the invention. At 502, one or more objects on the layout are identified for editing. The editing may result from the need to correct any design errors, rule violations, or issues that are otherwise identified with the layout.

At 504, the identified objects are edited in the layout. The editing may involve, for example, any change to the location, dimensions, or existence of the existing objects in the layout. These edits are then corresponding made to the data structure in the design database that correspond to edited objects.

The edited objects may correspond to a gap formed by trim metal in the design. Therefore, the editing of the layout objects in the previous steps may cause a change to the location or other properties of the corresponding gap shape. However, since the gap shape is not explicitly maintained in a materialized form in the design database (with the explicit shape information for the gap), this means that the process does not require any explicit editing/maintenance of any gap shape objects that may change as a result of the change to corresponding layout objects.

Instead, at 506, any edits to the existing objects inherently updates the properties of the gap shape, without having to separately edit any gap shape objects/structures. This may occur, for example, by the fact that since the gap shape is represented as one or more additional attributes within the layout object that was edited, then editing of the layout object will also inherently modify the gap shape data. For example, since the location of a gap shape is intrinsically tied to the location of a wire end that abuts the gap, then editing of the wire object to move that wire end will also inherently move the location of the gap shape—merely by editing the data corresponding to that wire end location for that wire object.

At some point in time, a need may occur for the existence of the gap shape information. This need for the gap shape may occur for any number of reasons, e.g., the gap shape may be needed to perform rule checking, the user interface may need information about the gap shape for rendering of display data for a display device, or other types of relevant operations as may be needed.

For example, at 508, a determination may be made that the gap shape is needed to perform rule checking or other relevant operations to ensure that the editing of the other layout objects does not create any rules violations for the trim metal. The size of the trim shape may have a large influence on the performance of a circuit design, and hence a fabrication facility may require an associated set of design rules that a router must obey to correctly generate a correct set of mask layers.

At 510, the gap shape can be reconstructed as necessary from related attributes that are included in other objects on the layout. For example, width, height, and color attributes for the gap shape can be extracted from the neighboring objects, and used to reconstruct the gap shape. Thereafter, at 512, the design rules are analyzed against the gap shape to determine whether any violations have occurred. If it is determined at 514 that rule violation has occurred, then the process returns back to 502 to correct the violations.

Figure 6A:
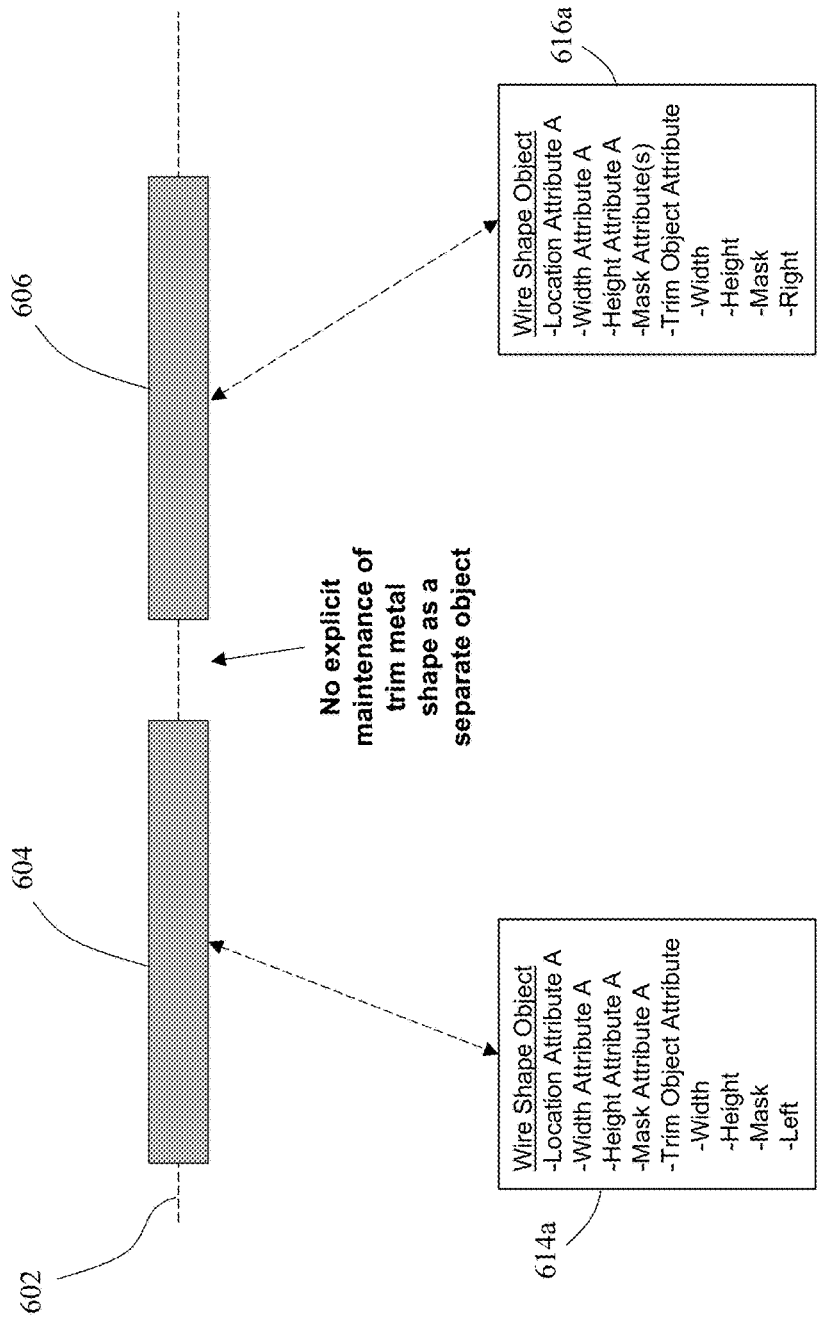
FIGS. 6A-F illustrate the process of FIG. 5.
Figure 6B:
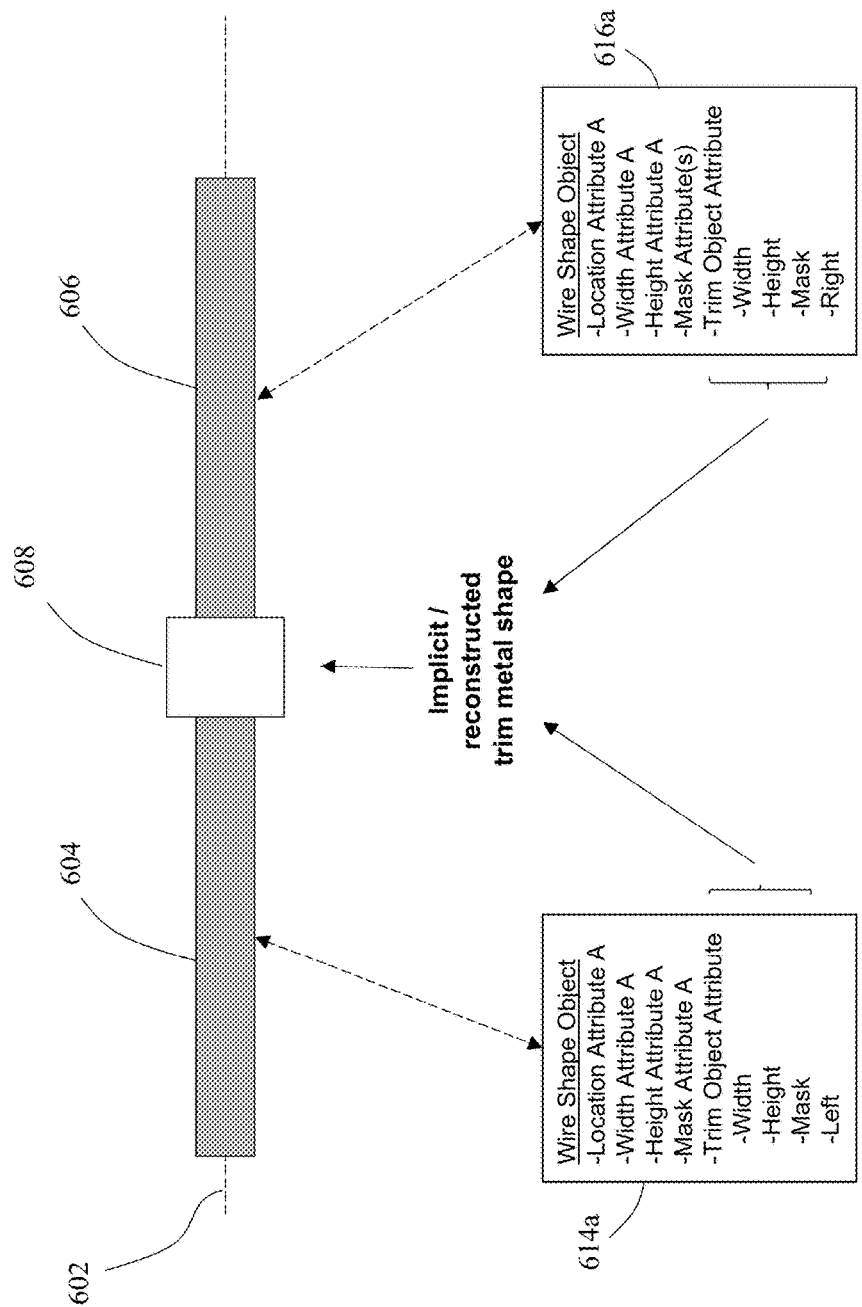

FIGS. 6A-F illustrates this process. FIG. 6A shows the starting locations for wire objects 604 and 606 that have been placed along routing track 602. As shown in this figure, wire shape 604 corresponds to structure 614a, which includes the attributes for wire shape 604. Similarly, wire shape 606 corresponds to structure 616a, which includes the attributes for wire shape 606. In this example, an explicit object structure is expressly not maintained for the shape properties of the gap between wire shapes 604 and 606. Instead, each of structures 614a and 616a include additional attributes that correlate to the shape of the trim metal for the gap, including width, height, and color attributes. As shown in FIG. 6B, to the extent that it is needed, the gap shape 608 can be reconstructed from the trim metal attributes within structures 614a and 616a.

Figure 6C:
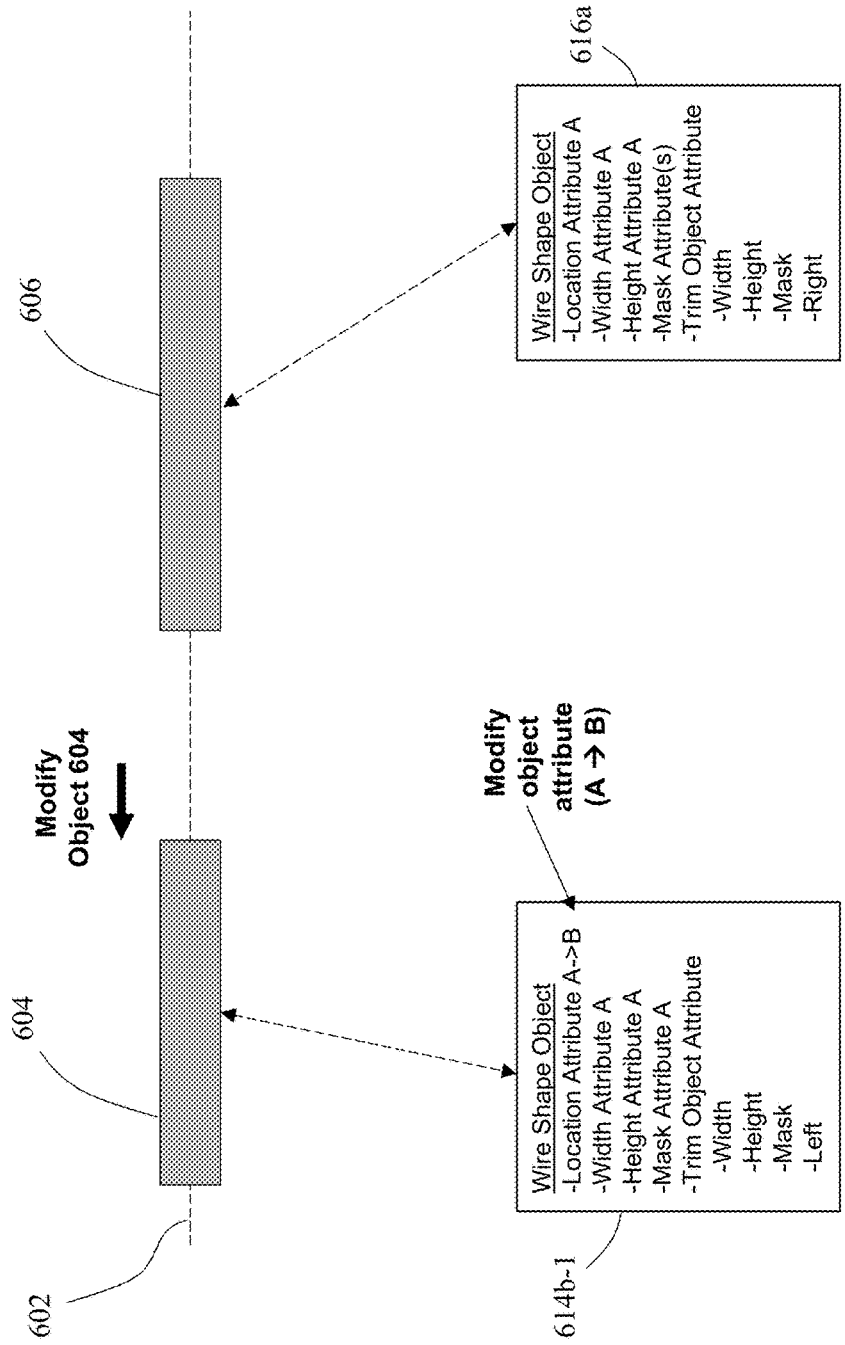

At some later point in time, editing may occur to the shapes in the layout. For example, as shown in FIG. 6C, wire shape 604 may be shifted in the leftward direction. This causes a corresponding change to the structure 614b-1 that holds the attributes for shape 604. In this case for example, the location attribute for this shape 604 would be modified in structure 614b-1 to reflect the edit that has occurred to the layout.

Figure 6D:
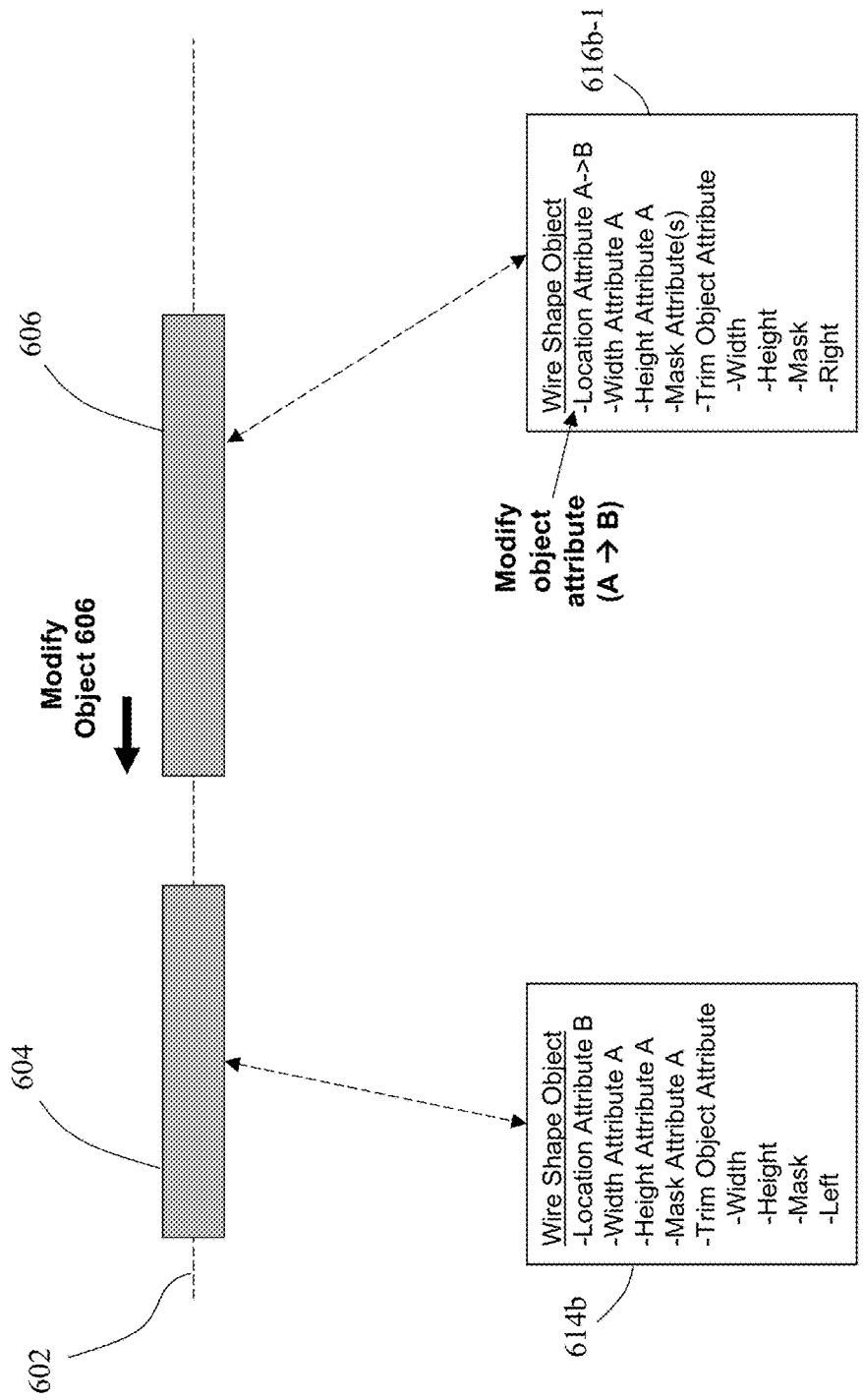

In a similar way, as shown in FIG. 6D, wire shape 606 edited to also be shifted in the leftward direction. This causes a corresponding change to the structure 616b-1 that holds the attributes for shape 606. As with the other wire shape, the location attribute for this shape 606 would be modified in structure 616b-1 to reflect the edit that has occurred to the layout.

Figures 1, 6E:
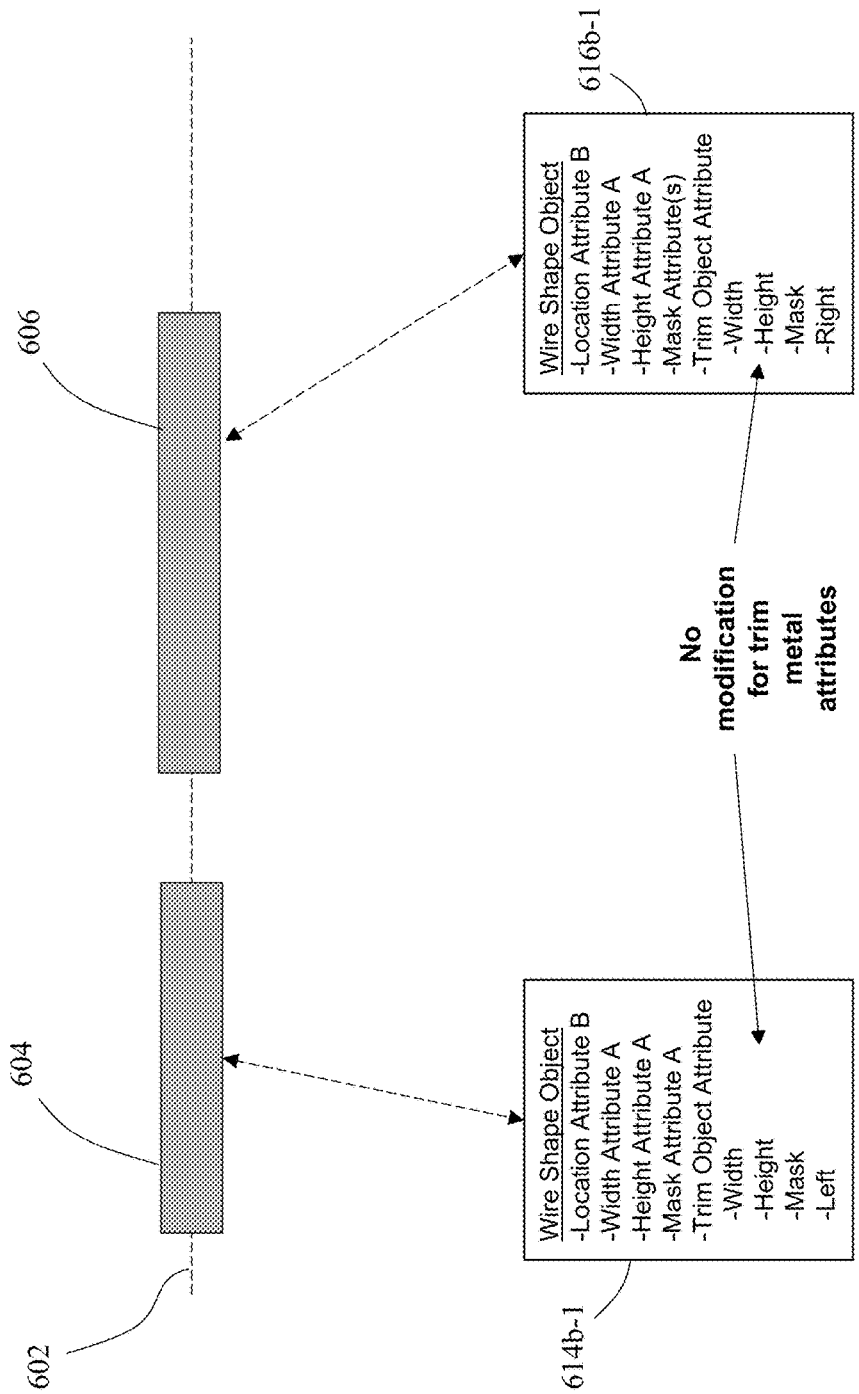
Figures 2, 6E:
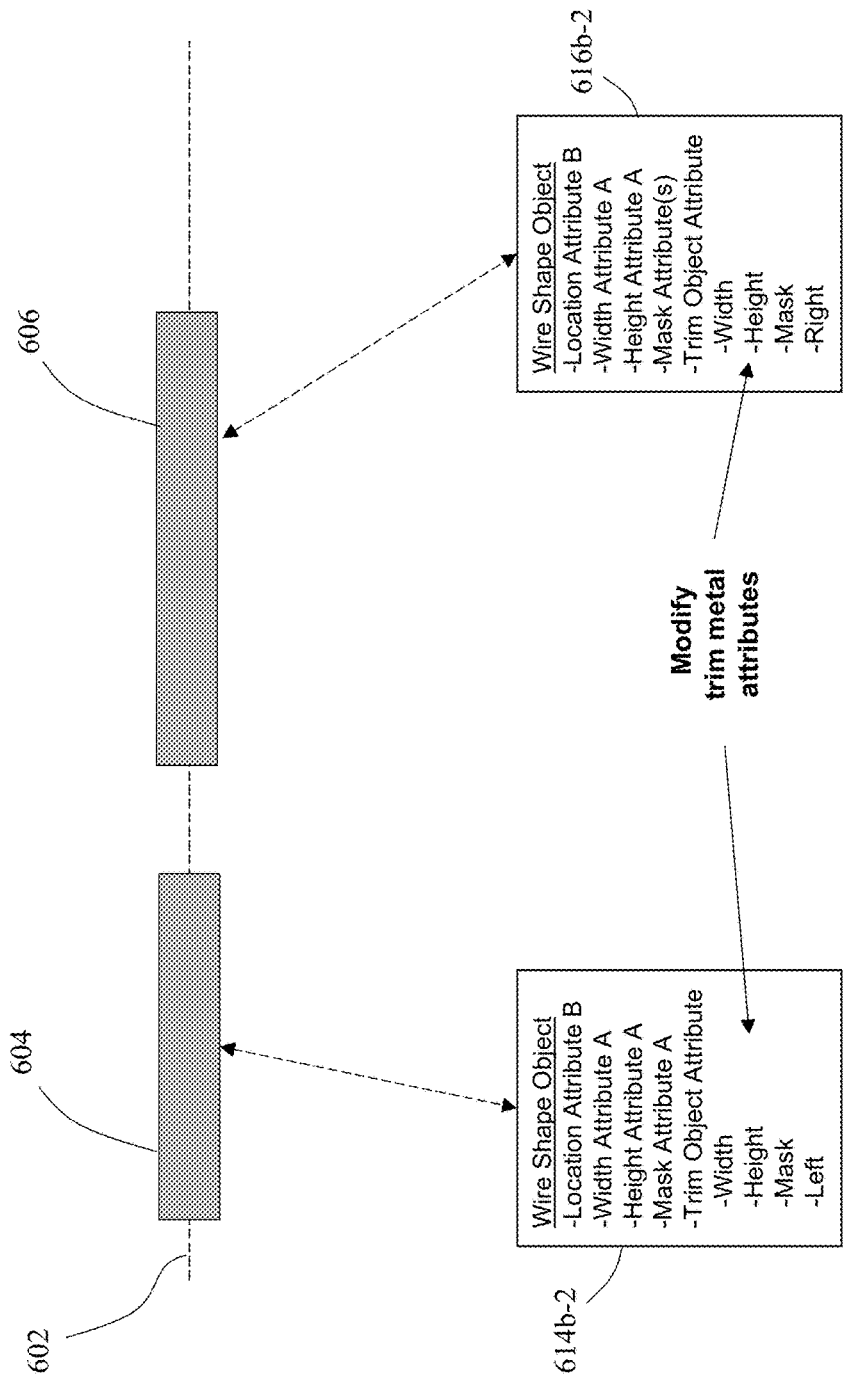

However, as shown in FIG. 6E-1, there is no need to modify any trim metal attributes or any materialized shape objects for the gap. This is because the trim attributes are relative to the wire-ends of shapes 604 and 606, and therefore the location of the gap shape will inherently be moved in correspondence to the movement of the wire-ends for shapes 604 and 606.

There may be certain exceptions for circumstances that warrant editing of the trim metal attributes. As just one example, consider the general rule that a fixed width exists for the gap between the wire ends. When this general rule exists, the width attribute will not need to change upon editing of other objects in the layout. However, as shown in FIG. 6E-2, it is possible that conditions exist whereby the gap width may need to be changed. In this case, editing may occur to width attribute of the structures 614b-2 and/or 616b-2 to account for the change in gap width.

Figure 6F:
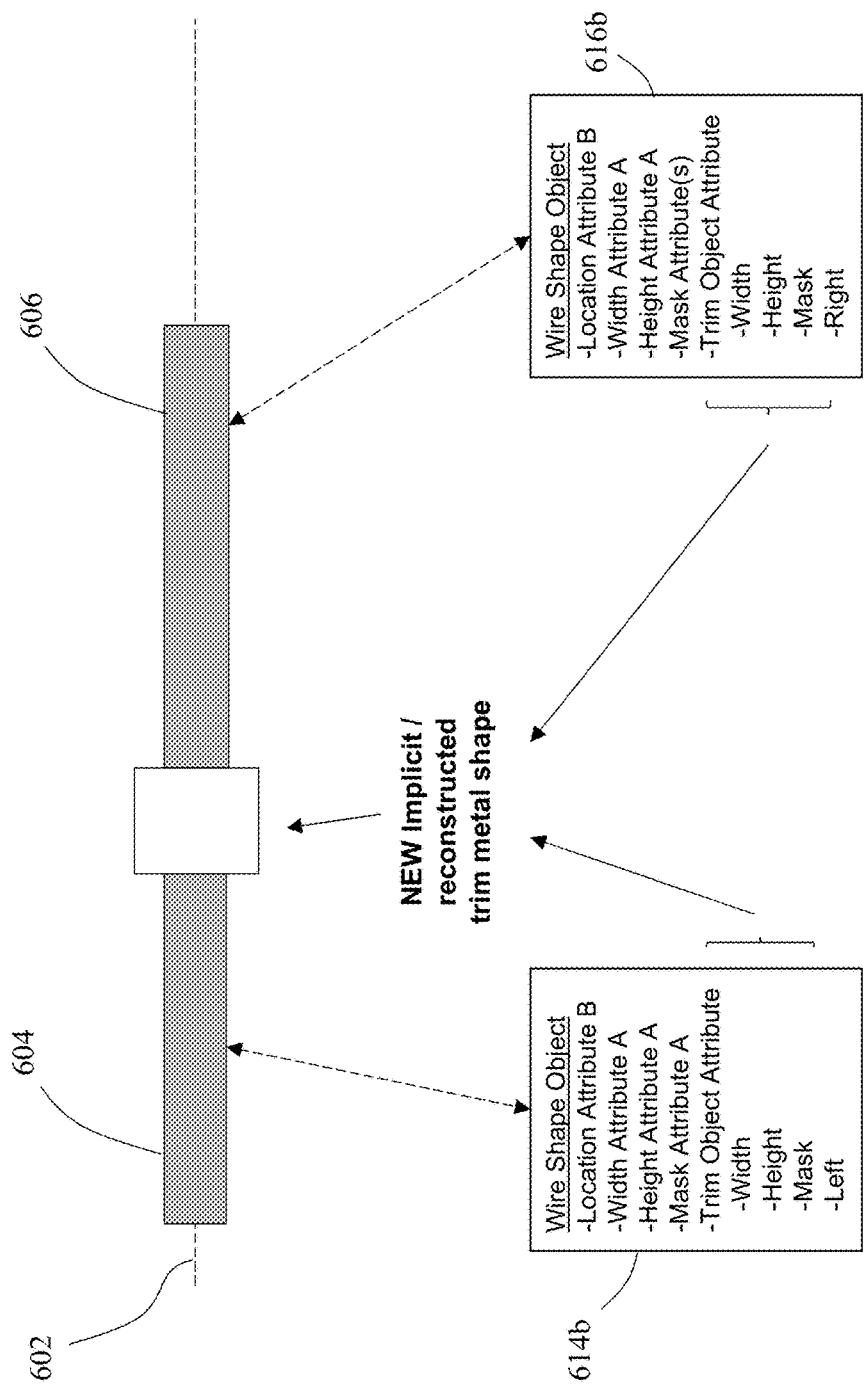

In any case, when there is a need for an explicit gap shape object, then the gap shape can be reconstructed as shown in FIG. 6F, e.g., to perform a design rule check on the gap shape. The gap shape can be reconstructed by using the current location of the wire ends for shapes 604 and 606, in conjunction with the trim metal attribute maintained in structures 614b and 616b.

While advantages of the invention are illustratively described above with respect to editing, it is noted that the invention can similarly be applied in an advantageous manner to other operations as well, such as routing. The routing operation can operate by maintaining attribute data for gaps in neighboring objects, which can then be transformed into materialized gap shapes as necessary. This approach enables net objects and trim objects to be handled in an efficient, and parallel manner.

As previously noted, with the advent of 32 nanometer (32 nm) technology and beyond (e.g., 22 nm, 14 nm, 10 nm, etc.), the trim mask require its own design rules that are often merged with metal layout design rules. The trim mask rules are often global in nature and thus pose significant difficulties in physical design implementation tools. For example, a typical line staggering rule may cover as many adjacent lines as possible, and thus modifying one line to obey this line staggering rule may affect the next line(s) or even lines that are distant from the line that is being modified. In addition, the trim mask rules are often directional in nature and depend upon how a mask feature is disposed on the trim mask relative to another mask feature. In addition, traditional design rule checking is based on geometries or geometric shapes in a physical design of an electronic circuit. Nonetheless, as described earlier, the trim mask rules and requirements are often merged with the layout design rules yet are oftentimes global and directional in nature. Although nothing prevents the application of a traditional design rule checking to an electronic circuit design with 32 nm or beyond technology nodes, the search time and hence the amount of time required for traditional DRC is proportional to log (n) even if the search is done locally (e.g., within a confined region of a layout), where n denotes the number of shapes in the entire layout. Such a traditional DRC approach often requires several hours or even days to complete its execution, especially for a modern electronic circuit design having hundreds of millions or even billions of transistors.

To address these problems, some embodiments of the invention pertain to methods, systems, and articles of manufactures for implementing multiple-patterning-aware correct-by-construction layout processing for an electronic design. One or more sets of grids for a metal layer may be defined, and a routing engine (e.g., a flexible coloring routing engine) is then used to determine a routing solution for an interconnect. Some embodiments instruct the routing engine to extend the end of the interconnect to an appropriate grid line in the one or more sets of grids. The attributes for the data structure of the interconnect may then be configured to include one or more attributes for adjacent trim metal shapes. The one or more sets of grids may be deemed as some routing tracks that are not to be used to route interconnects on the layer on which an interconnect is extended in some embodiments where only the right-way tracks are used for each routing layer. Rather, these tracks may be the routing tracks for an adjacent layer of the current layer on which interconnects are extended to the corresponding grids. For example, one or more sets of vertical routing grids may be defined or identified on a horizontal routing layer under consideration in some embodiments where a routing layer allows for only the right-way tracks. An interconnect may thus be represented and stored at a higher abstraction level in some embodiments. For example, an interconnect may be represented by the "high-end", the "low-end", and the "through-wire" attributes in a design database, rather than storing the shapes, length, etc. as is usually done with traditional design database. Some embodiments also apply similar processes to determine the routing solutions and allows for both the right-way and the wrong-way tracks on the same routing layer by using, for example, extra bit(s) in representing an interconnect in a data structure that is used to store the routing solution at a higher abstraction level. For example, the design data structure for the interconnect may be augmented by incorporating extra bits to store the "high-wire" and/or the "low-wire" to accommodate the wrong way tracks of the interconnect.

Figure 7:
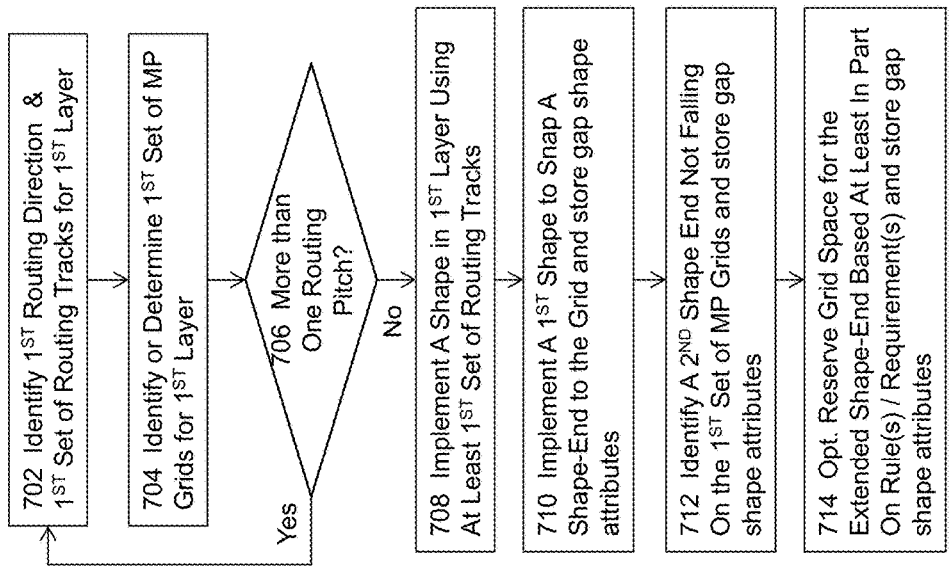
FIG. 7 shows a flow diagram for implementing correct-by-construction physical designs with multiple-patterning-awareness in some embodiments.

FIG. 7 illustrates a flow diagram for implementing correct-by-construction physical designs with multiple-patterning-awareness in some embodiments. In one or more embodiments, the method for implementing correct-by-construction physical designs with multiple-patterning-awareness illustrated in FIG. 7 may include the process 702 of identifying a first routing direction and a first set of routing tracks for a first layer of an electronic design. In some embodiments, a layer includes a routing layer or a metal layer. In some embodiments, a layer may allow only one routing direction (e.g., the preferred routing direction). In these embodiments, a lay may have only the right-way routing tracks and thus the right-way wires or interconnects (hereinafter interconnects). In these embodiments, the layers are stacked in an electronic design such that two adjacent layers have alternating routing directions. In some embodiments, a layer may have both routing directions (e.g., the preferred routing direction and the non-preferred routing direction).

In some embodiments, the process step 704 includes identifying or determining a first set of multiple-exposure (MP) grids for the first layer. In some embodiments, the first set of grids is used for multiple patterning or multiple exposure lithography processes, such as a self-aligned double patterning lithography process. More details about identifying or determining a set of MP grids are described in U.S. application Ser. No. 13/840,259, entitled "METHODS, SYSTEMS, AND ARTICLES OF MANUFACTURE FOR IMPLEMENTING MULTIPLE-PATTERNING-AWARE CORRECT-BY-CONSTRUCTION LAYOUT PROCESSING FOR AN ELECTRONIC DESIGN", the content of which is hereby incorporated by reference in its entirety for all purposes.

In some embodiments, the method illustrated in FIG. 7 may comprise the process 706 of determining whether there is more than one routing pitch to implement the physical design for the first layer. In some embodiments where it is determined that the first layer is to be implemented with a uniform routing pitch, the method may proceed to 708. Otherwise, the method returns to 702 to identify the next set of routing tracks with the next routing pitch and repeats the processes 702-706 until all routing tracks with different routing pitches have been processed.

In some embodiments, the method illustrated in FIG. 7 may comprise the process 708 of implementing a first shape in the first layer using at least the first set of routing tracks. In various embodiments, a routing track comprises an imaginary line that is used by physical design implementation tools (e.g., a router such as the routing engine described in U.S. application Ser. No. 13/465,917, filed on May 7, 2012, the content of which is hereby incorporated by reference in its entirety for all purposes) to lay out the center of a via or the centerline of an interconnect or wire (hereinafter interconnect). A set of routing tracks includes a plurality of such tracks that are parallel to each other with the routing pitch as the spacing between two adjacent tracks. A routing layer may include one or more sets of routing tracks, each having the same or a different routing pitch in some embodiments. Therefore, routing tracks on a single routing layer may have uniform or non-uniform routing pitch. For example, the process 708 may use the routing tracks to lay the centerlines of interconnects.

In some embodiments, the method illustrated in FIG. 7 may comprise the process 710 of implementing the first shape to extend a first shape-end of the first shape to a grid of the first set of MP grids. For example, process 710 may be used to route an interconnect from its originating location to its end location. Process 710 will then ensure that both shape ends of the interconnect fall on appropriate grids of the first set of grids. The process may further include configuring attributes of the first shape for the trim metal that is adjacent to the shape-end of the first shape. As discussed in more detail above, such attributes may include width, height, and color attributes for the trim metal shapes.

In some embodiments, the method illustrated in FIG. 7 may optionally comprise the process 712 of identifying a second shape with a shape end that does not fall on any grid of the first set of grids. In these embodiments, the electronic design may have one or more existing design elements (e.g., some interconnects), and process 712 may then identify the second shape end that does not fall on any grid and extend the second shape end to an appropriate grid of the first set of grids. The process may further include configuring attributes of the second shape for the trim metal that is adjacent to the shape-end of the second shape, e.g., where the attributes may include width, height, and color attributes for the trim metal shape.

In some embodiments, the method illustrated in FIG. 7 may optionally comprise the process 714 of reserving a grid space for the extended shape-end based at least in part on one or more rules, constraints, or requirements (hereinafter rules). The one or more rules may comprise, for example but not limited to, performance requirements related to the specific shape being implemented, criticality of the shape or the block of design including the shape, etc.

In some embodiments, process 714 reserves some additional space for an interconnect in the direction of routing the interconnect. The reservation of this additional space may further push other design elements away from the interconnect due to, for example, the minimum spacing rule.

Process 714 may further include configuring attributes of the shapes for trim metal adjacent to the wire-ends of the routed interconnects. As discussed in more detail above, such attributes may include width, height, and color attributes for the trim metal shapes.

While the above disclosure describes extension of a line-end to a grid, it is noted that some embodiments permit line-ends to be extended to other locations as well. For example, trim objects can be extended to align to a virtual grid, to improve DRC and to improve routability of the design.

Further details regarding and approach to implement correct-by-construction routing is described in U.S. application Ser. No. 13/840,717, filed on Mar. 15, 2013, the content of which is hereby incorporated by reference in its entirety for all purposes.

One of the advantages of some embodiments is that the layout implemented with various processes described herein is correct by construction in that the layout is generated without any violations of the coloring requirements for various design components with respect to rules for the multiple exposure lithography process or violations of any trim mask rules. This is especially advantageous because conventional DRC for trim mask rules may take up to several months to complete due at least partially to the directionality of the trim mask rules where, for example, the routing pitches are no longer uniform in adjacent layers, spacing requirements for two routing directions are no longer the same, and interconnects approaching from the right (or top) and interconnects approaching from the left (or bottom) are no longer treated equally, especially for advanced technology nodes with, for example, 14-nm, 10-nm, or 7-nm nodes. Another advantage of some embodiments is that the layout implemented with various processes described herein needs not be a complete layout in order to ensure correctness by construction. In other words, a physical design may thus be partitioned into multiple smaller portions, each of which can be implemented individually and independently in, for example, a grid computing environment or a parallel processing environment, and each of which will be correct by construction and free of any violations of the coloring requirements for various design components with respect to rules for the multiple exposure lithography process or violations of any trim mask rules.

While the present embodiment is specifically described using the term "lithography", it is noted that the inventive concepts are not restricted only to optical lithography, and indeed, is applicable to other types of lithography as well, such as EUV (extreme ultraviolet lithography).

Some additional embodiments pertain to an approach to implement improved trim metal data representation along with advanced with metal patch implementations. This approach enhances manufacturability in multi-exposure lithography for electronic circuit designs in one or more embodiments. The method may identify a track in a region of an electronic design and insert a wire-like (e.g., floating wire) fill segment along the track. The fill shapes may be implemented to serve any number of purposes. For example, one possible use scenario is to implement alignment of metal trim shapes in a layout by inserting fill for existing net metals. Multiple types of fill are supportable by embodiments of the invention. For example, a first type of type of fill that can be implemented is a full fill (e.g., where every track have both wires and cuts) and a second example type is a partial fill (e.g., where some tracks are left empty with no fill and no trim in the area).

In some embodiments, the method may first process the track before inserting the wire-like fill segment in some embodiments. In these embodiments, the track may be pre-processed based at least in part on one or more neighboring wire segments and at least one or more design rules. The wire-like fill segment may be subsequently inserted using the pre-processed track and may be subject to modification according to other design rule(s) or geometries. In some embodiments, the method may partition a track into one or more wire-like fill candidates based at least in part upon one or more neighboring wire segments and/or one or more design rules. For example, the method may project one or more wire end points of one or more neighboring wire segments onto an unoccupied portion of the track and determine which part of the unoccupied portion of the track is to be used for wire-like fill segment insertion. At least one of the one or more wire-like fill candidates may be subsequently processed to determine a final configuration for the wire-like fill segment. For example, a wire-like fill candidate may be extended, contracted, trimmed, partitioned, or merged with one or more wire-like fill candidates and/or an existing wire segment based at least in part upon one or more objectives or requirements and/or one or more design rules. Further processing wire-like fill segments may simplify a photomask design and may also reduce performance impacts on the electronic designs. For example, a wire-like fill segment along a track may be extended or trimmed in according with another wire-like fill segment or a wire segment along an adjacent track in order to align an end point of the wire-like fill segment with the corresponding end point of the another wire-like fill segment or the wire segment. In this example, the method may modify a wire-like fill segment so as to effectively simplify a rectilinear cut feature on a trim or block mask into a rectangular cut feature for manufacturing both the wire-like fill segment and the wire segment or the another wire-like fill segment with aligned end point. Moreover, inserting or processing a wire-like fill segment may further reduce or minimize performance impacts on the electronic circuits due to the insertion of wire-like fill segments by, for example, merging a wire-like fill segment with another wire-like fill segment or a wire segment, reducing or minimizing the common run length between a wire-like fill segment and an actual wire segment, etc. In some embodiments, a wire segment may also be extended to achieve the same objectives. In addition or in the alternative, the method may first insert a temporary, maximally spanning wire-like fill segment in the unoccupied portion based at least in part upon one or more design rules (e.g., line-end spacing rule governing wire segments along the same track) and determine the final configuration for the wire-like fill segment by subsequently trimming the temporary, maximally spanning wire-like fill segment according to, for example, one or more design rules and/or one or more objectives. At least some of these inserted wire-like fill segments may be further processed or modified by extension, contraction, merger, partitioning, trimming, etc. in accordance with one or more objectives or requirements. The wire-like fill segment inherits the width and photomask designation that are associated with the track. The inserted wire-like fill segments are thus correct-by-construction at least as far as one or more design rules are concerned. By pre-coloring the tracks, an electronic design with various components and wire-like fill segments automatically satisfies the multi-exposure lithography requirements without having to go through design decomposition processes to assign circuit features and wire-like fill segments to different photomask designs. Simulation and experimental results have demonstrated that electronic designs with wire-like fill segments inserted along unoccupied portions of track enhance the manufacturability of the design during the lithography processes. Trim metal may be represented in these approaches by configuring the attributes of objects adjacent to gaps for the trim metal shapes, instead of separately maintaining trim metal shapes as separate objects having this shape attribute information.

Figure 8:
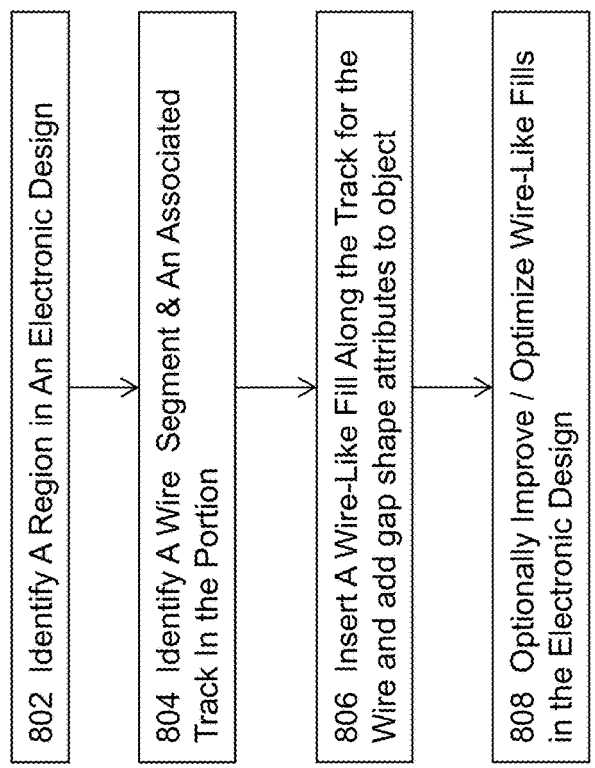
FIG. 8 illustrates a high level block diagram for a method or system for enhancing manufacturability of electronic designs for multi-exposure lithography in some embodiments.

FIG. 8 illustrates a block diagram for a method or system for enhancing manufacturability of electronic designs for multi-exposure lithography in some embodiments. In these embodiments illustrated in FIG. 8, the method or system may identify a region in an electronic design at 802. The region may include a cell, a block, an instance of a block or cell, or an arbitrary area (e.g., a windowed area in a layout editor) in an electronic design.

A wire or a segment thereof and its associated track on which the wire or the wire segment resides may be identified in the region at 804. It is assumed that the wire segment does not occupy the entire track in the region identified at 802 for the sole purpose of explanation and illustration. The "track" or "routing track" includes a one-dimensional fictitious line or line segment derived from the manufacturing grids provided by foundries. A routing track thus having zero width in physical designs (e.g., a layout of an electronic design) and is used to guide physical implementation tools (e.g., floorplanner, placement tools, or routing tools) to implement the physical design for an electronic design. For example, a routing tool may lay the centerline of a wire segment along a routing track during the routing process. A routing track may nonetheless be associated with a width to indicate that the particular routing track is to be used to route wires having the associated width. In this application, some routing tracks may be illustrated as rectangular shapes to indicate that such routing tracks are associated with the widths as shown in various figures. Nonetheless, the rectangular representations of such routing tracks are not intended to explicitly, implicitly, or inherently indicate that routing tracks have two-dimensional geometrical structures or shapes.

At 806, a wire-like fill is inserted along an unoccupied portion of the track for the wire. The wire-like fill segment inherits the width associated with the track. In some embodiments, the wire-like fill segment is inserted in such a way that at least one end of the wire-like fill segment is aligned with a corresponding wire segment or another wire-like fill segment on another track. Therefore, the wire-like fill segment includes a metal fill geometry having the same width as the wire segment along the same track in some embodiments. The wire-like fill segment may be disjoint from the wire segment when it is first inserted into the region such that the wire end of the wire-like fill segment is not connected with and at a distance from the corresponding wire end of the wire segment. Subsequent operations may or may not, however, merge the wire-like fill segment with the wire segment by extending the wire-like fill segment, extending the wire segment, or adding another metal wire segment to fill in the space between the wire-like fill segment and the wire segment in some embodiments.

The wire-like fill segment comprises a physical metal structure and will thus print together with other physical features in the electronic design. In some embodiments, the wire-like fill is inserted by considering various design rules such as the line-end rules governing the spacing between two end points of two segments of wires, wire-like fills, or a combination thereof. Such design rules may also include, for example but not limited to, a design rule against a wire-like fill having a mirror-image of another wire-like fill, a minimal length rule for a wire-like fill segment, etc. In these embodiments, wire-like fills are inserted into the region of the electronic design while automatically complying with various design rules upon insertion and are thus correct by construction at least as far as such various design rules are concerned.

A wire-like fill includes a metal fill having a finite length defined by the end points of the wire-like fill and a width that is associated with the underlying track in some embodiments. A wire-like fill may be floating and unconnected to any other components in the electronic design or may be connected to another wire segment along the same track to jointly form an extended wire. A wire-like fill in a first routing direction (e.g., the right-way routing direction of a routing layer) may occasionally join another wire segment in a second routing direction (e.g., the wrong-way routing direction of the same routing layer, if wrong-way routing is permitted) on the side of the another wire segment in some of the embodiments described herein. In some embodiments, the method or system also periodically or randomly checks the metal density rule during the insertion of wire-like fills although in the multi-exposure paradigm (e.g., sidewall image transfer or SIT, etc.), metal density rule check may be automatically fulfilled because such wire-like fills will be distributed among various photomasks.

Trim metal may be represented in these approaches by configuring the attributes of objects adjacent to gaps for the trim metal shapes, instead of separately maintaining trim metal shapes as separate objects having this shape attribute information.

At 808, the method or system may optionally improve or optimize at least some of the inserted wire-like fills to improve or achieve various objectives of the electronic design. Further details regarding an example approach to implement wire-like fills is described in co-pending U.S. application Ser. No. 14/465,853, filed on Aug. 22, 2014, which is hereby incorporated by reference in its entirety.

Figure 9A:
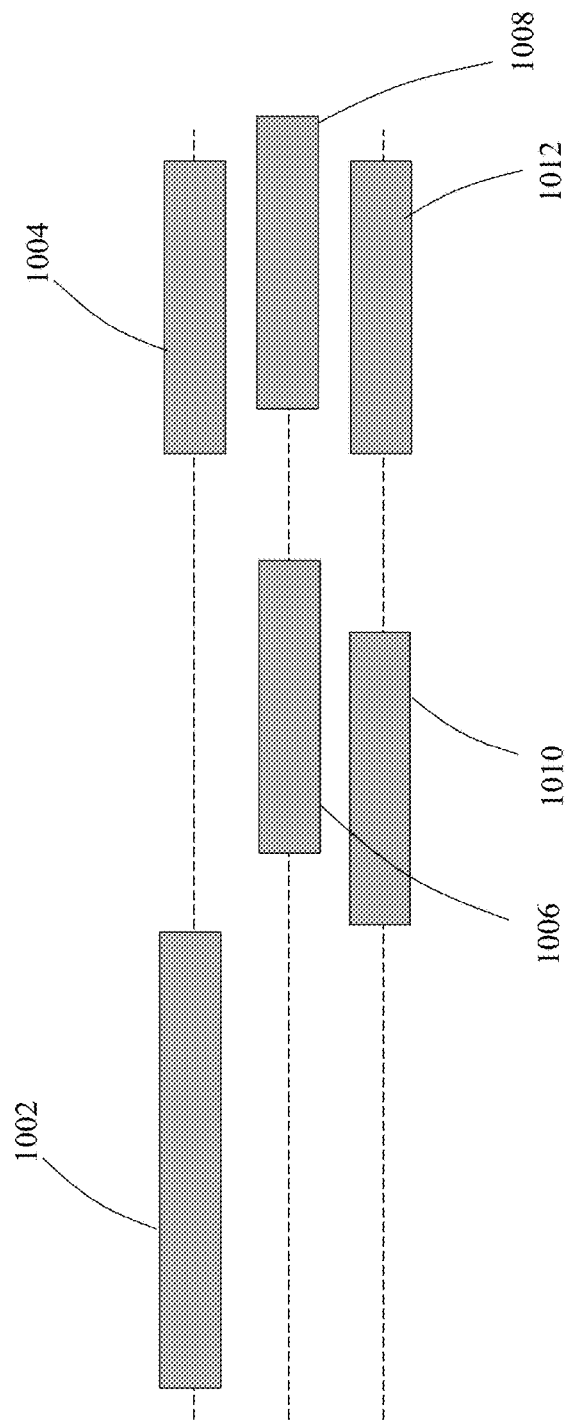
FIGS. 9A-C illustrate the process of FIG. 8.
Figure 9B:
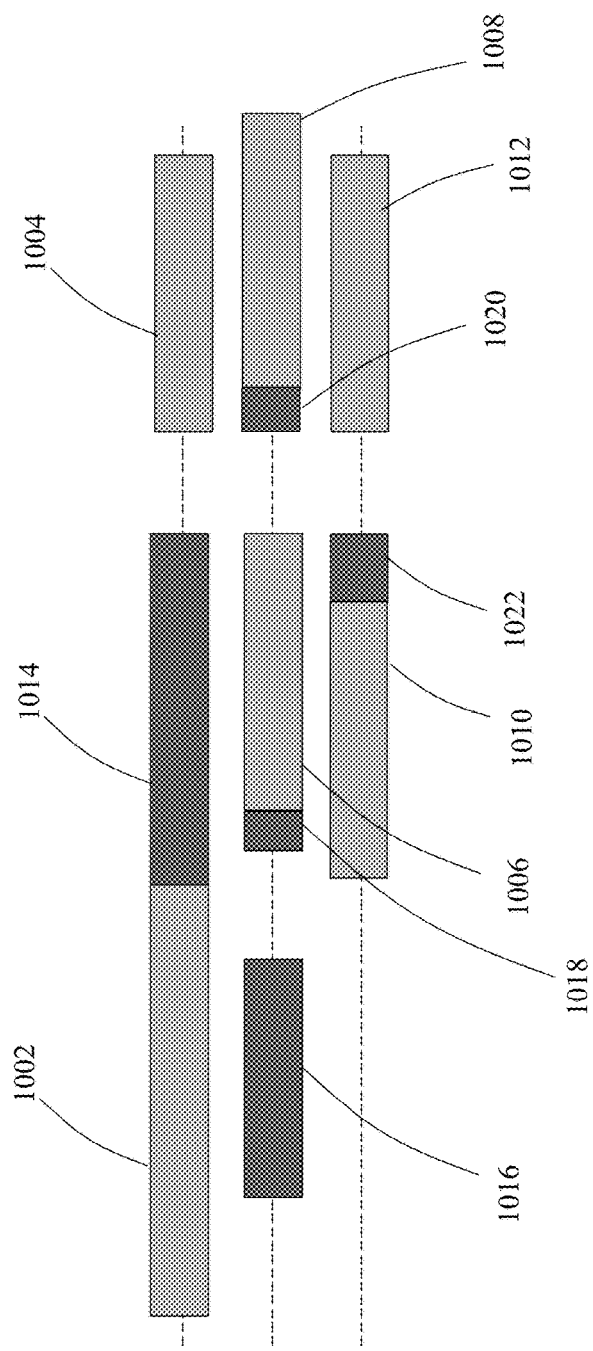
Figure 9C:
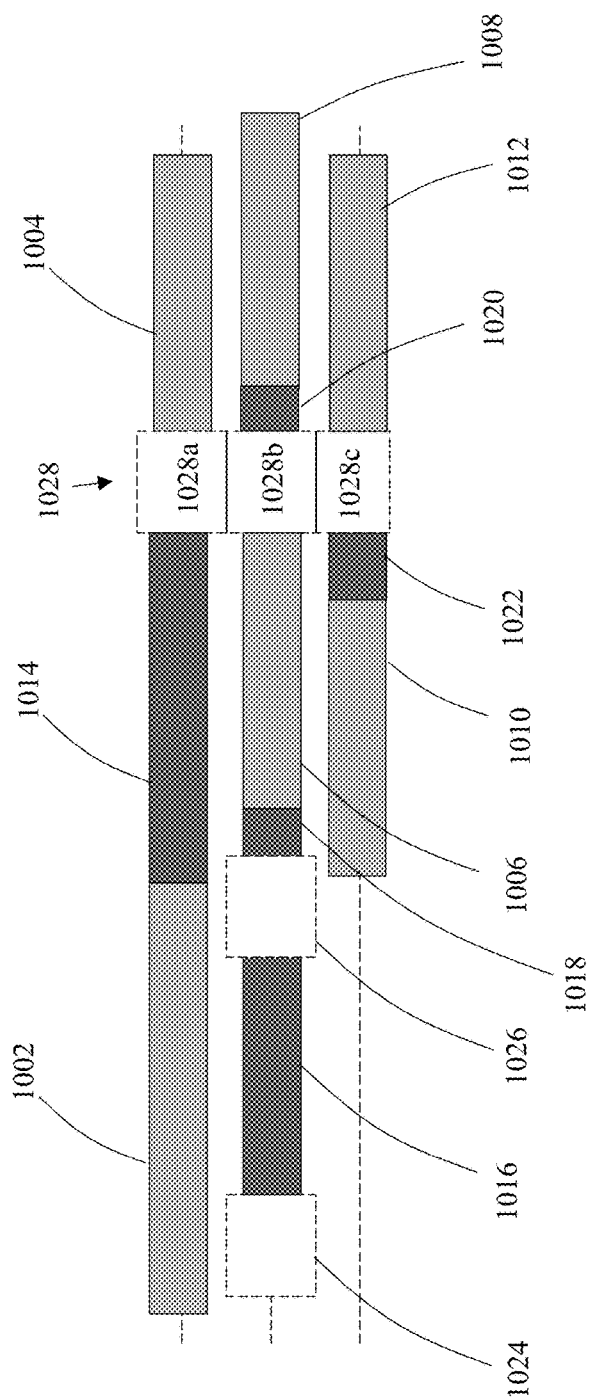

FIGS. 9A-C illustrate this process. The layout of FIG. 9A shows wire shapes 1002, 1004, 1006, 1008, 1010, and 1012. As shown in FIG. 9B, using the process described above, fill 1014, 1016, 1018, 1020, and 1022 may be inserted into the layout. These correlate to metal patches that either extend existing wires (1014, 1018, 1020, 1022) or are floating metal patches added by the routing process (1016).

According to some embodiments, trim metal gap shapes may be reconstructed from trim metal attributes included in the data structures for adjacent shapes. For example, as shown in FIG. 9C, trim metal shapes 1024, 1026, 1028*a*, 1028*b*, and 1028*c* may be reconstructed based upon attributes for these shapes that are included in adjacent wire and/or fill shapes. This means that the system does not need to continuously and persistently create and maintain structures having shape properties for 1024, 1026, 1028*a*, 1028*b*, and 1028*c*.

There may be any number of reasons to implement metal fill/patch extension in the design. In addition to the other reasons expressed above, one possible reason is to implement alignment of trim metal shapes in the design for manufacturability reasons. In the example shown in FIG. 9C, it can be seen that shapes 1028*a*, 1028*b*, and 1028*c* have been aligned together as a result of metal patches 1014, 1020, and 1022 being added to the layout. The alignment of these shapes 1028*a*, 1028*b*, and 1028*c* essentially creates a larger rectangular shape 1028 that can now be treated as a single shape within the design (e.g., for manufacturing, design, and/or verification purposes), rather than as three separate shapes.

Figure 10A:
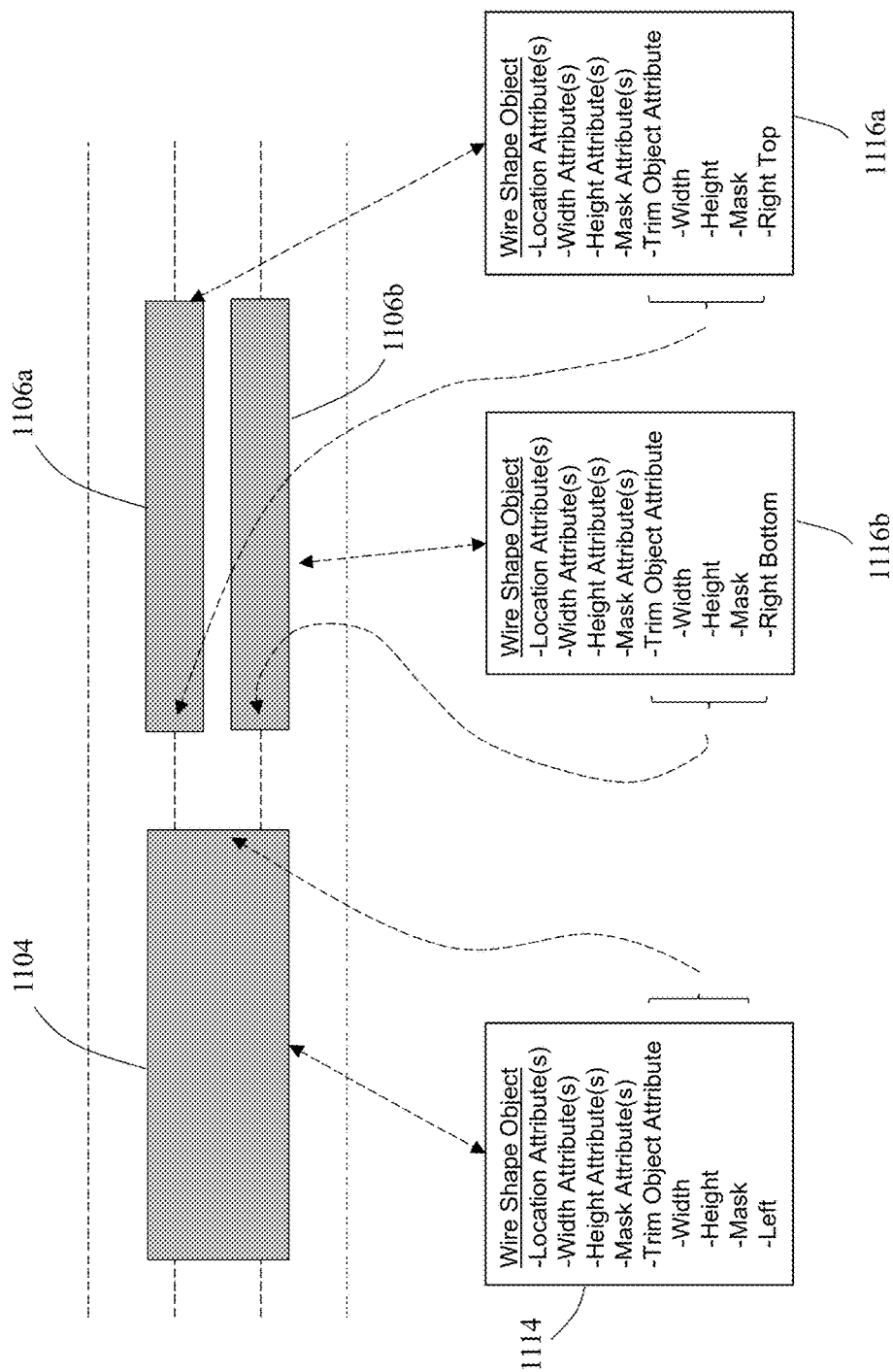
FIGS. 10A-B illustrate additional examples of approaches to implement trim data representations.

It is noted that while a one-to-one relationship has been previously illustrated for a left-side object and a right-side object with regards to the implicit trim metal shape, there is no requirement for the invention to be limited only to such a one-to-one relationship. For example, FIG. 10A shows a layout configuration in which the left side has a single shape 1104, and the right side has two shapes 1106*a* and 1106*b*. Here, each of the structures that correspond to these shapes include shape attributes for the gap between these left-side and right-side objects. Structure 1114 corresponds to shape 1104, and hence includes trim metal attributes for the gap shape 1108, e.g., width, height, mask/color, and left-side identification attributes. Structures 1116*a* and 1116*b* correspond to shapes 1106*a* and 1106*b*, respectively, and these structures include trim metal attributes tied to the right side of the trim metal shape. In this situation, the trim metal attributes within structure 1116*b* may identify object 1106*b* as corresponding to the bottom right side of the gap shape, while the trim metal attributes within structure 1116*a* may identify object 1106*a* as corresponding to the top right side of the gap shape. In an alternative embodiment, the attributes may identify both objects as being on the right side, without explicit identification of a top or bottom portion of the right side.

Figure 10B:
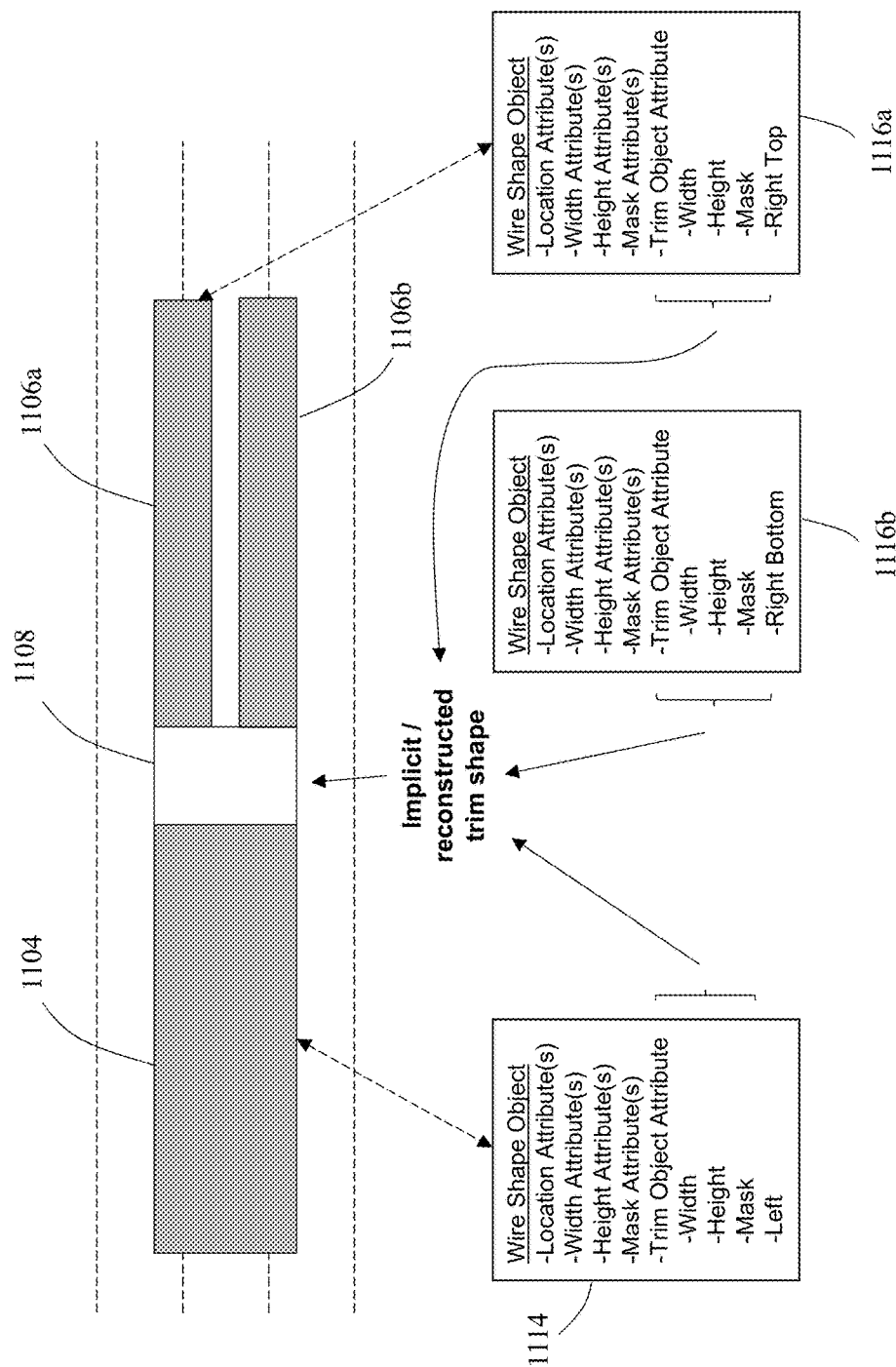

As shown in FIG. 10B, the gap shape 1108 can be reconstructed based upon the locations of the right-side metal-end for shape 1104 and the locations of the left-side metal-ends of shapes 1106*a* and 1106*b*, as well as the trim metal shape attributes included within structures 1114, 1116*a*, and 116*b*. This is regardless of the number of shapes on the right side and/or left side.

Therefore, what has been described is an improved approach to implement trim data representation for an electronic design. Instead of maintaining a gap shape object for every gap in the layout, existing objects adjacent to the gap location are configured to include attributes of the gap shape. The properties of the gap shape can then be derived from the adjacent objects. In this way, the system does not need to incur the expense of continuously creating and maintaining gap shape objects. Furthermore, any edits to the existing objects will inherently also result in updates to the properties of the gap shapes, without having to separately edit gap shape objects.

System Architecture Overview

Figure 11:
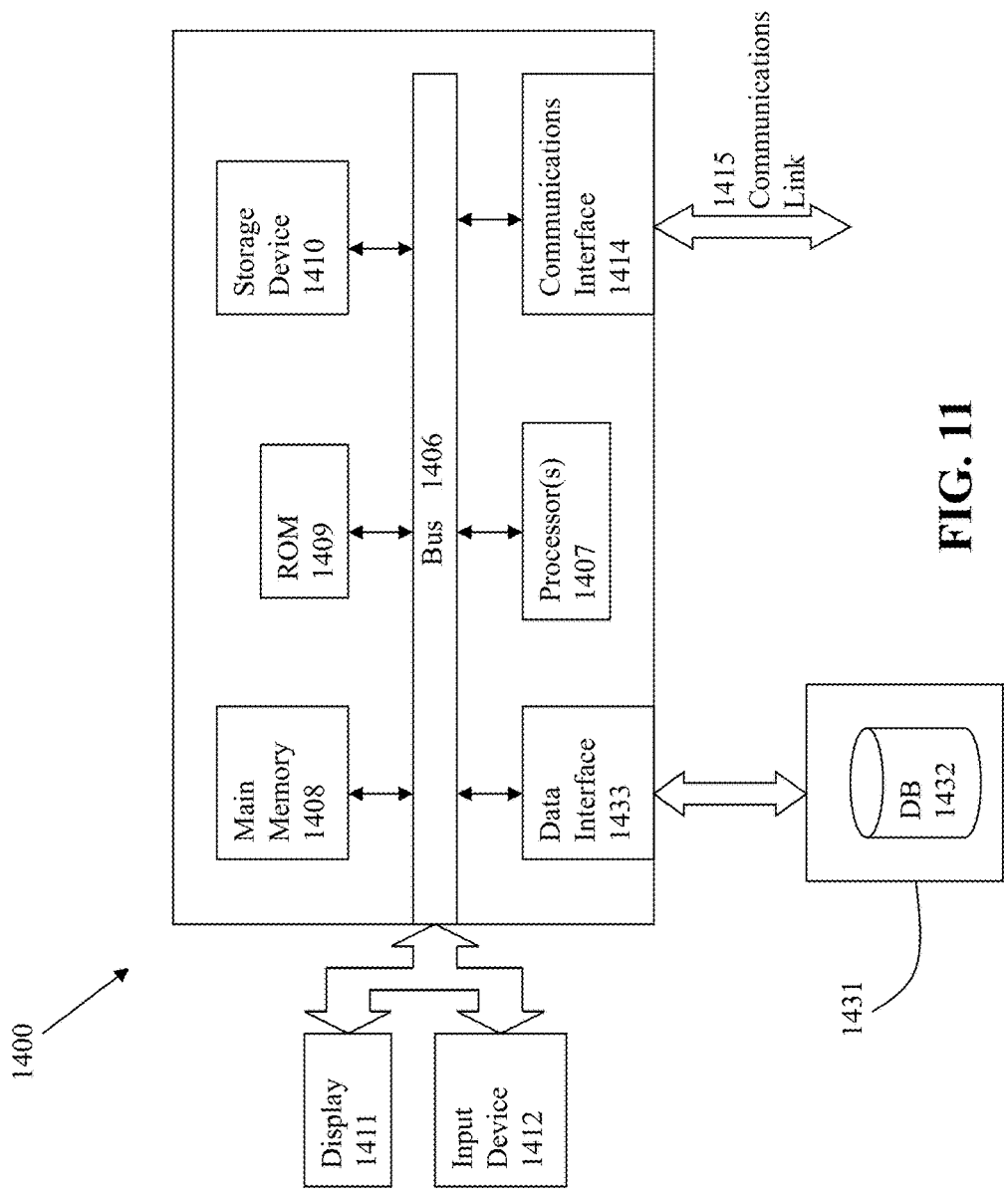
FIG. 11 depicts a computerized system on which some embodiments of the invention can be implemented.

FIG. 11 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, e.g., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method implemented with a processor, comprising:
    identifying a requirement for representing a gap formed by at least a layout object as a gap shape object in an electronic design of an electronic circuit;
    generating or updating a structure in memory or a storage device of a computing system at least by maintaining one or more attributes of the gap shape object in at least the layout object in the structure while complying with the requirement, rather than separately maintaining the gap shape object as a persistent object in the structure or other structures, wherein
        the gap correlates to a trim metal shape in a trim mask for multi-patterning manufacturing of the electronic design, and
        the structure is populated with shape properties of both the layout object and the gap such that the one or more gap shape attributes in the structure include gap shape properties for the gap;
    implementing, at a reconstruction module stored at least partially in memory of and functioning in conjunction with at least one microprocessor of a computing system, one or more modifications to the layout object in the layout, wherein the one or more modifications to the layout object trigger an implementation of at least one modification to the one or more gap shape attributes corresponding to the trim metal shape, without separate edits to the gap or the gap shape in the layout for compliance with the requirement; and
    generating, at the reconstruction module, a trim mask layout and causing multi-patterning lithography equipment to use at least the trim mask layout to trim the electronic circuit with the at least one modification to the trim metal shape to form at least the gap by referencing at least the structure for the layout object while satisfying the requirement.

2. The method of claim 1, in which a gap shape is reconstructed for the gap by accessing the one or more gap shape attributes stored within the structure for the layout object.

3. The method of claim 2, wherein the gap shape reconstructed for the gap is used to implement at least one of design rule checking, routing of the electronic design, or design display of the gap shape on a user interface.

4. The method of claim 1, wherein the one or more gap shape attributes comprise any combination of a height attribute, width attribute, color attribute.

5. The method of claim 4, wherein the height attribute comprises a height index value or the width attribute comprises a width index value.

6. The method of claim 1, wherein fill shapes are added to the electronic design, and at least one fill shape corresponds to the structure that includes the one or more gap shape attributes for the gap.

7. The method of claim 6, wherein the at least one fill shape implements alignment of multiple gap shapes by extending wires or adding a floating wire.

8. The method of claim 1, wherein the layout object is routed by extending an end of the layout object to a grid location.

9. The method of claim 1, wherein a separate structure is not continuously maintained to hold the gap shape properties of the gap.

10. A computer program product embodied on a non-transitory computer readable medium, the computer readable medium having stored thereon a sequence of instructions which, when executed by a processor causes the processor to execute a method comprising:

identifying a requirement for representing a gap formed by at least a layout object as a gap shape object in an electronic design of an electronic circuit;

generating or updating a structure in memory or a storage device of a computing system at least by maintaining one or more attributes of the Rap shape object in at least the layout object in the structure while complying with the requirement, rather than separately maintaining the gap shape object as a persistent object in the structure or other structures, wherein the gap correlates to a trim metal shape in a trim mask for multi-patterning manufacturing of the electronic design, and the structure is populated with shape properties of both the layout object and the gap such that the one or more gap shape attributes in the structure include gap shape properties for the gap;

implementing, at a reconstruction module stored at least partially in memory of and functioning in conjunction with at least one microprocessor of a computing system, one or more modifications to the layout object in the layout, wherein the one or more modifications to the layout object trigger an implementation of at least one modification to the one or more gap shape attributes corresponding to the trim metal shape, without separate edits to the gap or the gap shape in the layout for compliance with the requirement; and generating, at the reconstruction module, a trim mask layout and causing multi-patterning lithography equipment to use at least the trim mask layout to trim the electronic circuit with the at least one modification to the trim metal shape to form at least the gap by referencing at least the structure for the layout object while satisfying the requirement.

11. The computer program product of claim 10, in which a gap shape is reconstructed for the gap by accessing the one or more gap shape attributes stored within the structure for the layout object.

12. The computer program product of claim 11, wherein the gap shape reconstructed for the gap is used to implement at least one of design rule checking, routing of the electronic design, or design display of the gap shape on a user interface.

13. The computer program product of claim 10, wherein the one or more gap shape attributes comprise any combination of a height attribute, width attribute, color attribute.

14. The computer program product of claim 13, wherein the height attribute comprises a height index value or the width attribute comprises a width index value.

15. The computer program product of claim 10, wherein fill shapes are added to the electronic design, and at least one fill shape corresponds to the structure that includes the one or more gap shape attributes for the gap.

16. The computer program product of claim 15, wherein the at least one fill shape implements alignment of multiple gap shapes by extending wires or adding a floating wire.

17. The computer program product of claim 10, wherein the layout object is routed by extending an end of the layout object to a grid location.

18. The computer program product of claim 10, wherein a separate structure is not continuously maintained to hold the gap shape properties of the gap.

19. A system for analyzing a circuit design, comprising:
a microprocessor;
a memory for holding programmable code, wherein
the programmable code includes instructions for identifying a requirement for representing a gap formed by at least a layout object as a gap shape object in an electronic design of an electronic circuit; and the programmable code includes instructions for generating or updating a structure in memory or a storage device of a computing system at least by maintaining one or more attributes of the gap shape object in at least the layout object in the structure while complying with the requirement, rather than separately maintaining the gap shape object as a persistent object in the structure or other structures, wherein the gap correlates to a trim metal shape in a trim mask for multi-patterning manufacturing of the electronic design, and the structure is populated with shape properties of both the layout object and the gap, such that the one or more gap shape attributes in the structure include gap shape properties for the gap at least one reconstruction module that is stored at least partially in the memory of and functioning in conjunction with the microprocessor of a computing system and is configured to implement one or more modifications to the layout object in the layout, wherein the one or more modifications to the layout object trigger an implementation of at least one modification to the one or more gap shape attributes corresponding to the trim metal shape, without separate edits to the gap or the gap shape in the layout for compliance with the requirement; and the reconstruction module is further configured to generate a trim mask layout and to cause multi-patterning lithography equipment to use at least the trim mask layout to trim the electronic circuit with the at least one modification to the trim metal shape to form at least the gap by referencing at least the structure for the layout object while satisfying the requirement.

20. The system of claim 19, in which a gap shape is reconstructed for the gap by accessing the one or more gap shape attributes stored within the structure for the layout object.

21. The system of claim 19, wherein the one or more gap shape attributes comprise any combination of a height attribute, width attribute, color attribute.

22. The system of claim 19, wherein fill shapes are added to the electronic design, and at least one fill Shape corresponds to the structure that includes the one or more gap shape attributes for the gap, and wherein the at least one fill shape implements alignment of multiple gap shapes.

23. The system of claim 19, wherein the layout object is routed by extending an end of the layout object to a grid location.

* * * * *